United States Patent [19]

Ickinger et al.

[11] Patent Number: 4,955,268

[45] Date of Patent: Sep. 11, 1990

[54] APPARATUS CONTAINING A WORK SURFACE HEATED WITH A HEAT CARRIER MEDIUM

[75] Inventors: Georg Ickinger; Willibald Fermüller, both of Graz; Anton Paugger, St. Marein; Reinhard Pinter, Graz, all of Austria

[73] Assignee: Sulzer-Escher Wyss GmbH, Ravensburg, Fed. Rep. of Germany

[21] Appl. No.: 205,705

[22] Filed: Jun. 13, 1988

[30] Foreign Application Priority Data

Jun. 15, 1987 [AT] Austria .................................. 1512/87

[51] Int. Cl.⁵ ............................................. B21B 27/00
[52] U.S. Cl. ..................................... 29/130; 29/116.2; 34/110
[58] Field of Search .................. 29/116.2, 116.1, 121.1, 29/130; 100/93 RP; 165/89, 90, 91, 147, 168; 34/110, 124, 125

[56] References Cited

U.S. PATENT DOCUMENTS

| | | | |
|---|---|---|---|
| 1,790,700 | 2/1931 | Escole | 165/89 |
| 1,818,387 | 8/1931 | Dinzl | 165/168 |
| 1,884,612 | 10/1932 | Dinzl | 165/168 |
| 2,793,006 | 5/1957 | Eaby | 165/89 |
| 2,936,158 | 5/1960 | Ramundo | 100/93 RP |
| 3,135,319 | 6/1964 | Richards | 165/89 |
| 3,659,347 | 5/1972 | Wallsten | 34/124 |
| 3,914,875 | 10/1975 | Schiel | 165/90 |
| 4,635,710 | 1/1987 | Shelley | 165/56 |

FOREIGN PATENT DOCUMENTS

| | | | |
|---|---|---|---|
| 2450241 | 10/1974 | Fed. Rep. of Germany | 34/124 |
| 2277 | 12/1917 | Netherlands | 165/164 |

*Primary Examiner*—Howard N. Goldberg
*Assistant Examiner*—I. Cuda
*Attorney, Agent, or Firm*—Werner W. Kleeman

[57] ABSTRACT

The apparatus comprises a work surface heated by a heat carrier medium and located upon a heat-conducting layer carried by a metallic base body. The base body is provided with grooves at its surface confronting the heat-conducting layer and/or this heat-conducting layer is provided at its surface confronting the base body with grooves. The work surface is heated by infeeding the heat carrier medium into the grooves. To influence heat transfer to the heat-conducting layer carrying the work surface, particularly to a sheet metal plating or the like, for instance a cylinder jacket seated in direct metallic contact or only through the intermediate disposition of a transition layer of good thermal conductivity, upon the base body, there are provided control means regulating heat conduction from the base body to the heat-conducting layer and/or from the heat carrier medium guided in the grooves to the base body or the heat-conducting layer. This is accomplished by advantageously designing the confronting surfaces of the base body and heat-conducting layer, to possess recesses or supplementary grooves, different roughenings of the base body surface, additional lengthwise and/or transverse grooves in the base body surface or in the surface of the heat-conducting layer confronting the base body surface, or insulation strips.

79 Claims, 11 Drawing Sheets

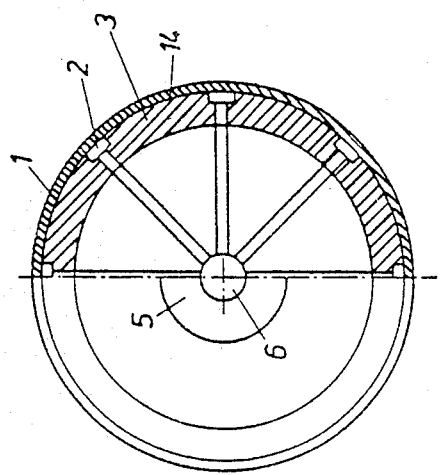
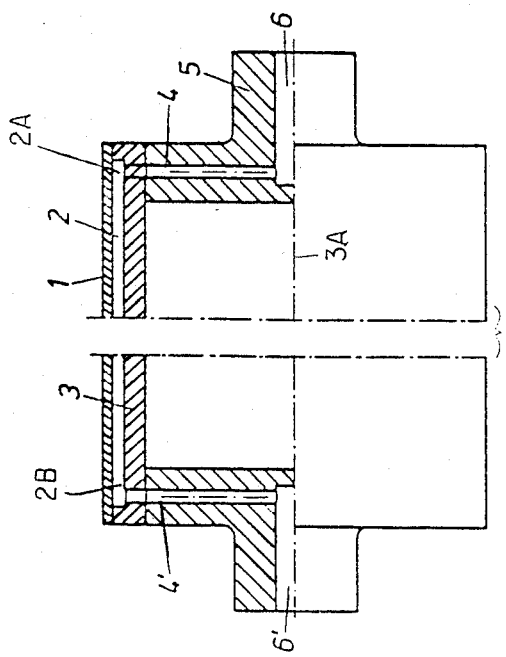
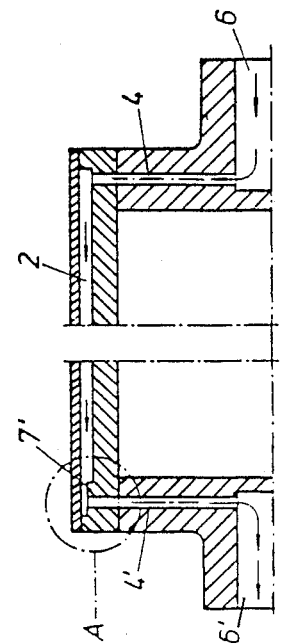

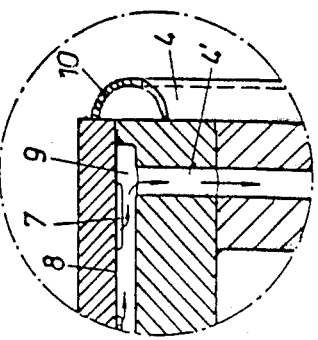
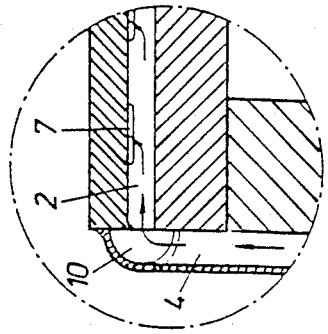
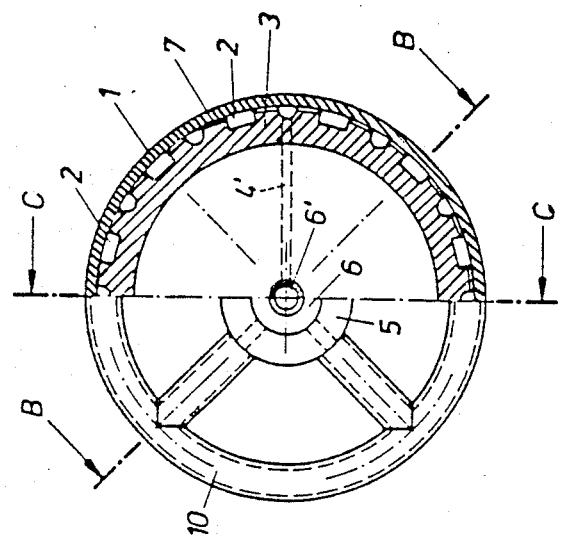
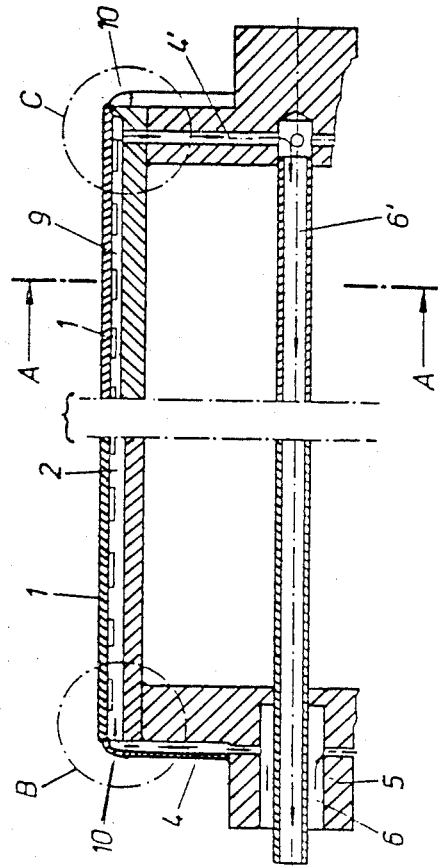
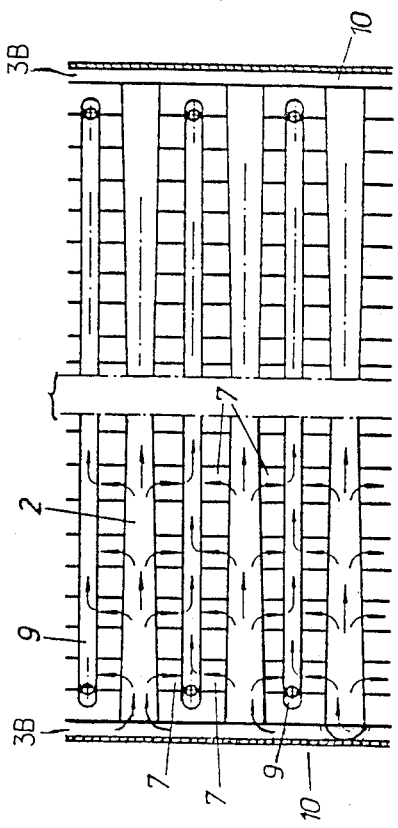

FIG.10a.
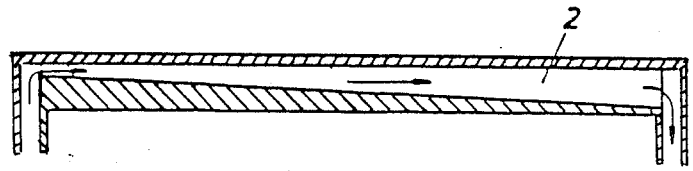
FIG.10b.
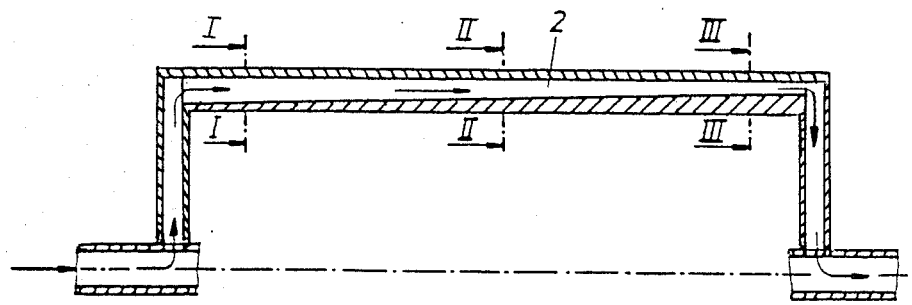
FIG.10c.    FIG.10d.    FIG.10e.
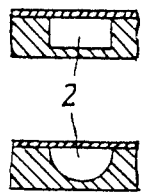 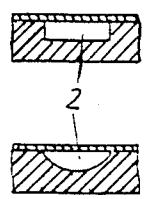 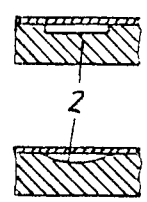
  
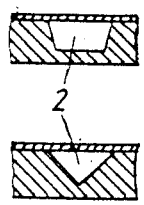 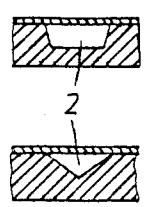 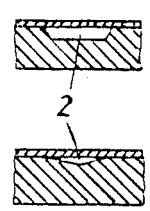

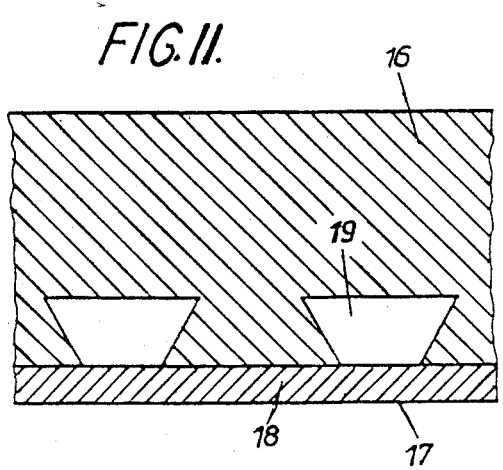
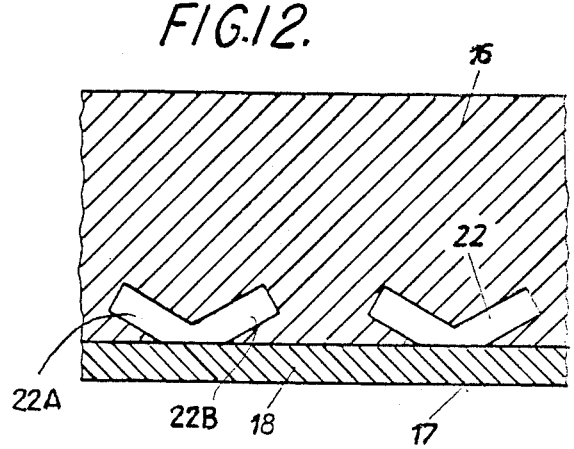
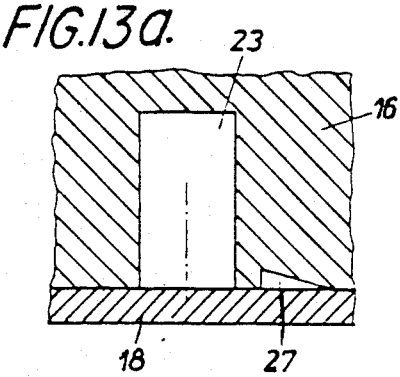
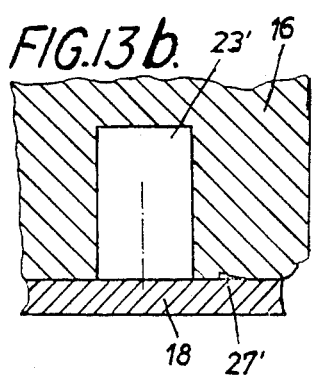
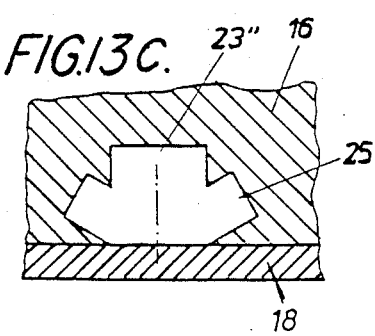
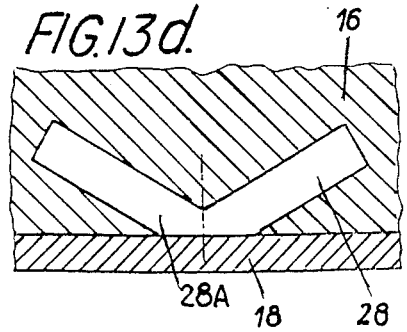
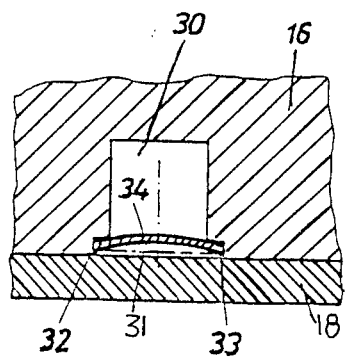

APPARATUS CONTAINING A WORK SURFACE HEATED WITH A HEAT CARRIER MEDIUM

BACKGROUND OF THE INVENTION

The present invention relates to a new and improved construction of an apparatus containing a work surface heated with a heat carrier medium. The present invention further pertains to a new and improved method and apparatus for the fabrication or manufacture of grooves or the like in a workpiece or body, such as the core cylinder of a heated cylinder, particularly, although not exclusively, the heated cylinder or press roll used in a papermaking machine.

In its more specific aspects, the present invention relates to an apparatus containing a work surface heated with a heat carrier medium, preferably steam. The work surface can be constituted, in particular, by a heated mold, a heated press punch, a heated press roll or a heated press plate or a heated cylinder, respectively, for instance for papermaking machines. The work surface is located upon a heat- or thermally-conducting surface layer, especially sheet metal plating or the like, for instance the cylinder jacket or shell. This heat-conducting surface layer is carried by a metallic base body or base member, for instance a core cylinder. The base body, for instance the core cylinder, is provided with grooves at its surface confronting the heat-conducting surface layer, especially the sheet metal plating or the like and/or this surface layer, especially the sheet metal plating, is provided with grooves at its surface confronting the base body, for instance the core cylinder. These grooves constitute a number of grooves which are preferably mutually parallel and, for instance, if desired, extend at least in part parallel to the axis of the core cylinder. Heating of the work surface, especially the mold or the cylinder is accomplished by infeed of the heat carrier medium, especially steam, into the grooves. As mentioned, the invention is particularly concerned with a cylinder or roll, especially for use in papermaking machines, for instance drying, crepe or calender cylinders or the like, and which cylinder or roll is heated by a heat carrier medium, especially steam.

Such type of cylinders or rolls, when used in process technology, serve to render possible a high heat or thermal energy transfer from the heat carrier medium, especially steam, to the cylinder surface. This is particularly of significance for drying cylinders and crepe cylinders in the papermaking industry.

There are known drying cylinders or crepe cylinders which, while functioning as pressure vessels, are charged with saturated steam up to a pressure of about 10 bar. Due to condensation, heat arrives at the medium or material which is to be heated up by means of the cylinder jacket or shell. Particular measures are undertaken in order to maintain the condensate film thickness as thin and uniform as possible. The measures which were used for this purpose entailed the employment of siphons and scoops, for instance. A prerequisite for the uniform thermal effects at the medium is that there is present as uniform as possible thermal pattern or course along the generatrix of the cylinder. It is for this reason that there are required exact internal machining and numerous siphons.

With such type of cylinders attempts have been made to maintain the heat transfer surfaces free of condensate film in order to economically improve the heat transfer. This has been done, for instance, due to the use of internal rib structure and so forth. Furthermore, to increase the heat transfer attempts have been made to achieve higher temperatures and higher steam pressures. However, the increasing wall thickness counteracts enhanced heat transfer. Yet, in order to overcome this problem, and at the same time to render possible pressure and temperature increases, there have been provided, for instance, bending-resistant, drying cylinders.

SUMMARY OF THE INVENTION

Therefore with the foregoing in mind it is a primary object of the present invention to provide a new and improved construction of apparatus provided with a work surface heated by a heat transfer medium, which does not suffer from the aforementioned drawbacks and shortcomings of the prior art constructions.

Another and more specific object of the present invention aims at designing jacketed drying cylinders for condensating heat transfer medium in such a manner that there can be accomplished at the cylinder surface a predeterminate or strived for, for instance a particularly uniform heat transfer, and there is especially achieved a better heat transfer with more uniform temperature distribution in relation to the heretofore described arrangements.

A further important object of the present invention generally relates to the provision of apparatuses equipped with a work surface heated by a heat carrier medium, especially steam, such work surfaces being constituted, for instance, by heated molds, heated press punches, and heated press plates, which are employed, for instance, for the fabrication of plastic articles.

In keeping with the preceding object, it is a further noteworthy object and it is of particular advantage if there can be accomplished at the previously mentioned work surface a predeterminate, particularly advantageously uniform heat transfer and there can be made available a well-regulatable thermal supply, particularly an improved heat transfer with more uniform temperature distribution in relation to the presently known arrangements.

A further important object of the present invention is concerned with an improved method and apparatus for the accurate and efficient fabrication of grooves or the like in a workpiece or body, especially, although not exclusively, in a core cylinder of a heated cylinder or press roll, typically as used in a papermaking machine.

Now in order to implement these and still further objects of the invention, which will become more readily apparent as the description proceeds, the apparatus of the previously mentioned type and serving for influencing the heat or thermal energy transfer from a base body, for instance core cylinder, to a surface layer carrying the work surface, especially to the sheet metal plating or the like, for instance the cylinder jacket or shell, which is seated with direct metallic contact or only while intermediately incorporating a good thermally conductive transition layer, for instance plastic layer or a heat-conducting paste, upon the base body, for instance core cylinder, is provided with control means regulating the heat conduction from the base body to the surface layer, especially to the sheet metal plating or the like and/or from the heat carrier medium guided in the grooves to the base body or to the surface layer, especially to the sheet metal plating or the like. This can be particularly accomplished by appropriately configuring the mutually confronting surfaces of the base body and the surface layer. This can be advantageously achieved in that in the walls of the grooves and/or adjacent such grooves in the base body surface confronting the surface layer, especially the sheet metal plating or the like and/or in the surface of the surface layer, especially sheet metal plating surface, confronting the base body, especially the core cylinder, there are arranged recesses or supplementary grooves and/or, if desired, different roughened portions of such base body surface or additional lengthwise or transverse grooves or furrows in such base body surface or in the surface of the surface layer confronting the latter, especially in the sheet metal plating surface or the like and/or insulation strips and/or metal strips and/or hollow bodies in the grooves or at the mutually confronting surfaces of the base body and the surface layer, especially the sheet metal plating or the like and/or grooves or supplementary grooves having over at least a part, for instance the entire part, of their length a continuous, preferably uniformly changing or varying cross-section and/or different materials of the surface layer, especially alloys of the sheet metal plating or the like.

All of the aforementioned control means serve both as individual measures as well as also in partial and also in total combination to achieve the task of influencing or rendering uniform the thermal energy or heat made available to the outer surface of the previously mentioned surface layer or sheet metal plating or the like. To the extent that one is concerned with heated cylinders or rolls, especially for use in papermaking machines, the grooves which extend substantially parallel are machined into the surface of the core cylinder as well as there being drawn, especially shrunk, onto the core cylinder and in metallic contact therewith a metallic cylindrical outer jacket or shell while forming pressure chambers between such outer jacket or shell and the core cylinder. This metallic cylindrical outer jacket or shell can be welded at its edges with the core cylinder. These grooves possess over at least a portion of the length thereof, for instance over the entire part of their length, a continuously, preferably uniformly altering or varying cross-section or cross-sectional configuration. In the case of such cylinders or rolls there are particularly resolved two important objectives:

On the one hand, at the cylinder surface it is desired to assure for a particularly uniform or predeterminate heat transfer and, accordingly, a good uniform quality of the material guided over the cylinder. To this end, there is especially used the continuously altering groove cross-section. As an aid to this effect is the fact that the grooves are machined into the cylinder body, in other words are machined out of the "solid" material; it is to be observed that the core cylinder is to be the "dominating heating surface". As emphasized, the outer jacket or shell is preferably drawn, in other words, shrunk in a hot or heated condition onto the core cylinder, so that the heat transfer is particularly augmented. On the other hand, according to the invention, the heating medium, especially the steam which is at excess pressure, is introduced between the outer jacket or shell and the core cylinder into the groove spaces provided at the core cylinder body. The excess pressure is thus built up between this outer jacket or shell and the core cylinder. There is thus not present any pressure vessel in the sense of the requirements of boiler construction, something which appreciably reduces the fabrication and testing work.

In British Pat. No. 188,925, there is taught only a cylinder smooth machine, comparable to an ironing machine, the inner cylinder of which possesses lengthwise grooves at the outer jacket. However, in contrast to the present invention, at this grooved inner cylinder there is drawn thereon a felt jacket. The design of the grooves according to the present invention is not disclosed in this British Pat. No. 188,925.

According to Austrian Pat. No. 283,102, it is possible for the therein disclosed roll serving for heating of paper webs to have an inner jacket and outer jacket formed of sheet metal. Since the inner jacket is fabricated of thin sheet metal there are not provided therein any grooves. Quite to the contrary, for guiding the medium in the intermediate space, there are arranged between both of the sheet metal jackets helically shaped, curved guide rails upon which there is seated the outer jacket. In contrast thereto, the outer jacket or shell of the present development is directly drawn onto the core cylinder, in other words is seated with good thermally conductive contact upon such core cylinder and upon the outer edges of the side walls of the grooves which have been machined into this core cylinder. Additionally, with this prior art construction there also is not provided any teaching of the inventive construction and arrangement of the grooves.

Both the inventive direct metallic contact of the metallic outer jacket with the metallic core cylinder and also the important construction and arrangement of the grooves which are directly machined into the core cylinder as well as their continually altering or varying cross-section over at least a portion of their length, serve to realize optimum utilization of the infed thermal energy and, in particular, the controlled distribution thereof over the cylinder outer surface as well as the optimum transfer of the thermal energy to such outer surface, without there having to be complied with the boiler construction requirements for pressure vessels. This cross-section alteration or variation can be predetermined in relation to the cross-section size and/or the cross-section shape and/or the groove height and/or the groove width. The outer jacket which is drawn in known manner so as to be in metallic contact with and directly seated upon the core cylinder does not have assigned to it any dimensional-stabilizing task and thus can be fabricated with lesser wall thickness.

The heat carrier medium thus can be introduced as closely as possible to the process medium or the material which is to be dried. The grooves machined into the roll body, the particular configuration of which will be hereinafter described, have the task of distributing the heat carrier medium over the cylinder surface. A particularly uniform heat transfer at the entire surface of the cylinder can be realized if the grooves have unequal cross-section in such a manner that the heat carrier medium can be correspondingly controlled. The core cylinder has dimensional-stabilizing tasks and is not pressure impinged at the inner hollow space, so that this core cylinder, as already indicated above, need not be designed as a pressure body. The excess pressure is formed between the roll body and the outer jacket or shell so that a pressure vessel in the sense of a boiler structure is not present. Steam or water vapor is advantageously employed as the heat carrier medium.

An appreciable concept of the present invention is that the core cylinder is employed as the dominating heating surface for heat transfer, since in particular by means of the metallically contacting or drawn-on contact surfaces of the outer jacket heat can flow from the roll core to the outer jacket or to the process medium which is to be heated.

Due to the appreciably higher heat transfer during condensation of the heat carrier at the boundary surface of the groove located at the core cylinder, wherein each such groove is continually freed of the water film by the centrifugal force, the major part of the heat infeed is possible in this manner. Computations have shown that it is thus possible to obtain a heat transfer which is one- to three-fold greater.

Advantageously, the grooves extend, as is known, substantially parallel to the axial direction of the cylinder, so that with the thus formed ribs there can be obtained an improvement of the dimensional stability. According to the invention, due to the welding of the edges of the outer jacket with the core cylinder there is realized an additional dimensional stability by externally situated, additional tension zones of the inertia profile.

The cross-section of the grooves or supplementary grooves can be round, especially circular or trapezoidal, rectangular or triangular. The construction also can be modified such that the cross-section of the grooves, viewed in radial direction, increases from the inside towards the outside. Also it can be advantageous if the cross-section, especially the height and/or the width, of axially parallel lengthwise grooves continuously increases or decreases from internally of the cylinder to the cylinder end sides or faces. In this regard, to achieve the uniformity or regularity of the heat transfer the steam can be delivered from both sides of the cylinder or when working with a plurality of cylinders alternately in opposite or alternate directions. Also charging of the steam at a number of locations of the cylinder by means of pipe conduits and a circulating ring groove or annulus is sensible in the case of over-length cylinders with low tolerance limits of the heat distribution. All of these measures are suitable in order to appropriately realize a desired tolerance zone or field of the temperature distribution at the cylinder surface.

It is advantageous to provide at the lateral or outlet-side end of axially parallel lengthwise grooves before the outlet line for the heat carrier medium, especially when working with steam, at the groove base a protuberance or weir or overflow in order to constrict the groove cross-section or to form a gap. Such gap functions in a regulating fashion upon the condensate film thickness, since upon exceeding the desired condensate film thickness the steam which has slipped through entrains the condensate.

Additionally, there can be provided in the core cylinder, in addition to the lengthwise grooves having a continuously or continually varying cross-section over at least a part of their length, and preferably in alternation with such lengthwise grooves and essentially in parallel disposition with respect thereto, condensate outflow grooves. These condensate outflow grooves are connected via channels extending especially in the circumferential direction or circumferential grooves with the lengthwise grooves. It is possible that the condensate outflow grooves possess smaller cross-section than the lengthwise grooves or that the groove base of the condensate outflow grooves is disposed radially further towards the outside than the groove base of the lengthwise grooves. Also possible is that the groove base of grooves extending in circumferential direction are situated further radially towards the outside than the groove base of the lengthwise grooves for the steam infeed and, in particular, also radially further towards the outside than the groove base of the condensate outflow grooves.

Basically, the cross-section of the circumferential grooves can essentially correspond to the cross-section of the condensate outflow grooves. Additionally, the circumferential grooves in their course which is interrupted by the lengthwise grooves can be connected by cavities or recesses traversing the lengthwise grooves, preferably with partially cylindrical base surface. It also can be advantageous if in the core cylinder there are formed circumferential grooves in circumferential direction, the depth of which corresponds to the depth of the lengthwise grooves for the steam infeed. In this connection it is also advantageous if there are formed in the core cylinder islands bounded by the circumferential grooves and lengthwise grooves, shallow condensate outflow grooves which extend in circumferential direction and preferably open into the lengthwise grooves and which open into the condensate outflow lines or conduits. The condensate outflow lines can be grouped together in a separate pipeline system located within the core cylinder. Finally, it is also possible to guide or arrange the lengthwise grooves for the infeed of the steam and, if desired, the condensate outflow grooves, as is basically known, in helical configuration, if desired with a pitch angle of 10° to 30° about the core cylinder.

As mentioned, the control of the heat or thermal energy transfer can be accomplished by appropriate structuring of the grooves. Thus, for instance, the cross-section of the grooves can be angle-shaped or angular. This angle-shaped structuring of the grooves advantageously can be provided in spaced relationship from the inlet side, particularly at or near the outlet side of the heat carrier medium in the groove. For reasons of fabrication it can be especially advantageous if the recesses or supplementary grooves are provided at the side flanks of the grooves advantageously in spaced relationship from the inlet side, especially at or near the outlet side of the heat carrier medium in the groove. Moreover, with recesses or supplementary grooves provided in both groove flanks it is advantageous if their axes enclose an angle of less than 180°.

A further favorable possibility of controlling the heat transfer or availability of heat or thermal energy at the work surface can reside in the fact that preferably in or near the inlet side of the heat carrier medium in the groove there are arranged supplementary grooves adjacent such groove which, in particular, possesses a rectangular cross-section. These supplementary grooves are provided at the surface of the base body confronting the surface layer, in particular confronting the sheet metal plating or the like and/or in the surface of the outer surface layer, in particular the sheet metal plating, confronting the base body, particularly the core cylinder. Such supplementary grooves are open in the direction of such surface layer or base body, as the case may be. These supplementary grooves, each preferably having a triangular cross-sectional configuration, are arranged at one or both sides of the groove, and such triangular supplementary grooves can be widened at the surfaces of the surface layer or base body, for instance by manual grinding.

The temperature or temperature pattern at the work surface also can be controlled according to a further aspect of the invention, in that advantageously, there are provided metal strips or insulating strips which bridge the groove opening. Such metal strips or insulating strips are advantageously provided in or near the inlet side of the heat carrier medium at the region of the surface of the base body confronting the outer surface layer, especially the sheet metal plating or the like. The metal strips or insulating strips also can be provided in the surface of the outer surface layer, particularly the sheet metal plating, and which confronts the base body, especially the core cylinder.

The previously mentioned continuously altering or varying groove cross-section can be obtained in a practical manner in that, viewed in the flow direction of the heat carrier medium, the cross-section of the groove transforms into a cross-sectional configuration, in particular into an essentially angle- or angular-shaped cross-sectional configuration, from the inlet side through the groove center to the outlet side. This transformation is advantageously gradually undertaken from a form of essentially rectangular, triangular or trapezoidal configuration into a form having supplementary grooves or recesses in the groove flanks, especially into an essentially angle- or angular-shaped cross-sectional configuration.

The fabrication of supplementary grooves or recesses in the groove flanks, in other words having angle-or angular-shaped cross-section, can be accomplished advantageously in that, particularly to obtain grooves or supplementary grooves which extend at an inclination from the surface of the base body, especially with respect to the jacket surface of the core cylinder, there is applied a disc miller or the like at an inclination to this jacket surface or inclined to the tangential plane of such core cylinder. With the aid of this disc miller or milling device, there can be fabricated the groove or supplementary groove from the contemplated inlet side of the heat carrier medium with decreasing depth.

According to a further design of the invention there can be provided grooves or supplementary grooves both in the base body, for instance core cylinder, as well as also in the surface layer, for instance in the sheet metal plating. The grooves in the base body and the grooves or supplementary grooves, respectively, in the outer surface layer can be superimposed or correspond in relation to one another.

In summation it is thus emphasized that with the invention it is of particular concern to accommodate the heat transfer profile in the course of the groove by configuring the contact surface of a base body, for instance core cylinder or a core jacket, and outer surface layer, for instance a cylindrical outer jacket, for instance by controlling the roughness thereof during machining, by incorporation of heat damming grooves, by insertion of insulation layers, by changing the thermal or heat conductivity of the surface layer or the outer jacket or by using different alloys. By machining recesses or supplementary grooves, as the case may be, in the side flanks of the grooves and by changing the depth of such recesses or supplementary grooves, there can be influenced the heat transfer to the outer surface layer.

In particular, by intentional design and change in the size of the cross-sectional surface of the groove, there can be undertaken an influence upon the flow velocity of the heat carrier medium. This can be undertaken to intentionally achieve a predeterminate thickness of the condensate film and thus to contact its effect upon the heat transfer. The hollow spaces of the previously mentioned hollow bodies can be filled by heat carrier media or insulation media, and, for instance, can possess thermal conductivity coefficients which change in the groove direction. In the plane of the contact surface of the base body or core cylinder, as the case may be, and outer surface layer or outer jacket there can be machined a seat. In this seat there can be mounted a metal or plastic plating or plate, and, for instance, the plating thickness can possess a continuously varying or changing cross-section in the groove transverse or groove lengthwise direction. The plating forms in curved direction transverse to the groove direction and past the course of the groove a hollow space of different dimensions between this sheet metal plating and the outer surface layer or the outer jacket. This is done in consideration of the condensate formation in this hollow space and the thus attainable insulation effect upon the heat transfer.

The seat of the metal or plastic plating can be configured such that there can be accommodated a metallic or plastic plating having wedge-shaped plan configuration through a conically extending groove at the region of the contact surface between the outer surface layer or outer jacket and the base body or core cylinder or core jacket. In this way, there can be obtained a form-locking seat of a metallic or plastic plating in the contact location of base body and outer surface layer or outer and inner jackets of the heated cylinder. In particular, by undertaking an intentional configuration of the machining of the contact surfaces, there can be machined additional grooves or furrows in the lengthwise or transverse direction of the groove at different spacing and different depths, possessing different configuration and roughness, so that there is realized a predeterminate heat transfer.

According to the invention it is also conceivable to design a multi-branch groove by providing branched portions, or by grouping a plurality of grooves into one groove to alter the groove spacing of the adjacently guided grooves and to thus likewise exert an influence upon the predetermined heat transfer. With the aforementioned groove fabrication by disc millers or the like, the groove can be fabricated by the disc miller in two working operations in such a manner that the disc millers are applied relative to one another at an angle. For instance, the disc millers can be applied at an angle between 15° and 90° with respect to the contact plane of the outer surface layer and the base body or the core cylinder and the outer jacket, as the case may be, once being inclined to the left and once to the right for forming the side flanks.

The feed of the disc millers transverse to the groove direction in the course of the lengthwise extent of the groove, can alter preferably continually or continuously, so that a groove shape of M to X to V-cross-sectional configurations can be realized and vice versa. This is accomplished for obtaining a predeterminate heat transfer. At the region of the M-shaped groove there can be applied an insulation or insulation layer in the conically tapering sector of the contact surfaces between the outer surface layer and the base body or the outer jacket and core jacket, as the case may be.

Recesses or supplementary grooves laterally of the main or primary grooves or to both sides thereof can be machined by means of sets of milling devices in one operation. In particular, the cutting edges or teeth to produce the supplementary grooves, which are to serve as heat transfer reducing or dam-up grooves, are inclined at angles of 5° to 30° with respect to the contact surface and upon altering the groove depth there is simultaneously configured the heat damming groove width.

In summation there is accentuated the following design of the inlet side of the groove in consideration of the there strived for heat transfer reducing effect. These design measures can be randomly selected or combined, depending upon the strived for purpose, namely:

heat transfer reducing by means of different groove depths, insertion of metal strips for the purpose of condensate formation, different surface roughness or contact surface roughness (by virtue of lathe machining at the contact locations, in particular the shrink seat of heated cylinders), heat blocking or transfer reducing grooves laterally of the main or primary groove, and different thicknesses of the outer surface layer or outer jacket wall.

As previously mentioned, the invention is also concerned with an improved apparatus for the fabrication of grooves in a workpiece or body, such as the core cylinder of a heated cylinder. Such fabrication or machining apparatus comprises a first milling machine for milling main or primary grooves which extend substantially parallel to the axis of rotation of the core cylinder. This first milling machine has disc millers which define a plane with the axis of rotation of the core cylinder. The first milling machine has a first rotation axis and is displaceable in the direction of the axis of rotation and is displaceable transverse to the first rotation axis in order to produce the main grooves to a desired depth and, if desired, with a predeterminate altering cross-section. A second milling machine serves for milling supplementary grooves in both flanks of the main grooves. The second milling machine has disc millers defining a plane parallel to the axis of rotation of the core cylinder. The second milling machine has a second rotation axis. The second milling machine is displaceable in the direction of the axis of rotation of the core cylinder, displaceable transverse to the second rotation axis and pivotable from an angle at one side of the radius of the core cylinder to the same angle at the other side of the radius in order to produce the supplementary grooves to the desired depth, if desired with a predeterminate altering cross-section and having a desired angle between the groove flanks.

As to the inventive method for the fabrication of grooves which extend at an inclination from the jacket surface of a core cylinder, such comprises the steps of bringing a disc miller into an operating position, applying the disc miller at a predetermined inclination to a tangential plane of the core cylinder, and guiding the disc miller in the direction of the axis of the core cylinder and simultaneously transverse to the rotation axis of the disc miller so that the inclined groove is fabricated with decreasing depth from a contemplated inlet side of a heat carrier medium.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein FIGS. 1 to 10e show completely or in detailed illustration different embodiments of cylinders or rolls, especially for papermaking machines, and heated by steam. FIGS. 11 to 23d illustrate details of sections at the groove region of apparatuses having a work surface heated with a heat carrier medium, especially steam, this work surface generally can be provided at a heated mold, at a heated press punch, at a heated press plate or at a heated cylinder, for instance again for papermaking machines. This work surface can be planar or curved, the latter particularly also then when dealing with a heated cylinder, but also in the case of heated molds, for instance for the fabrication of plastic articles. With respect to FIGS. 24 and 25 there is illustrated therein the fabrication of grooves and supplementary grooves provided at their flanks, especially damming or dam-up grooves, in heated cylinders.

Figure 2C:
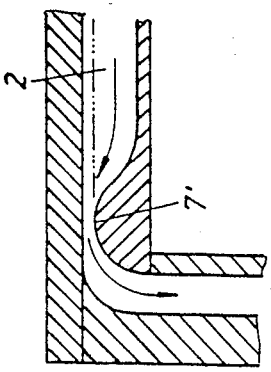
Figure 2B:
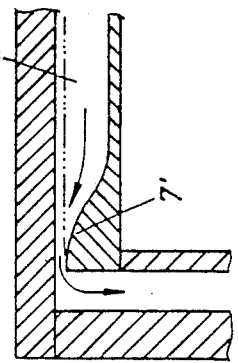
Figure 2A:
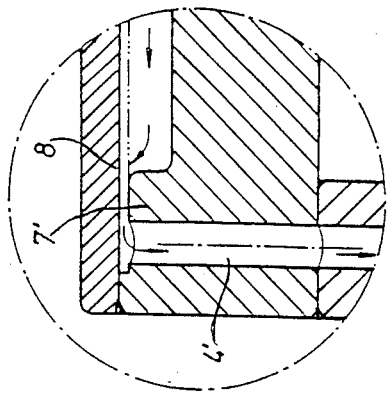
Figure 4:
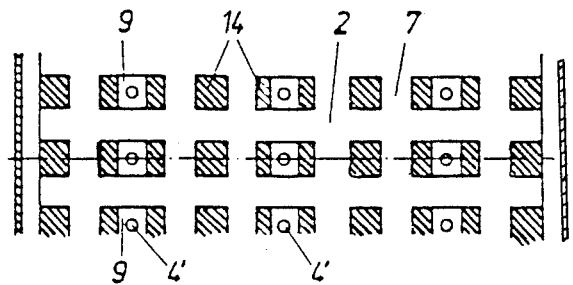
Figure 4A:
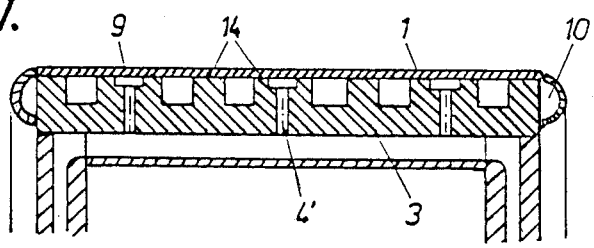
Figure 5:
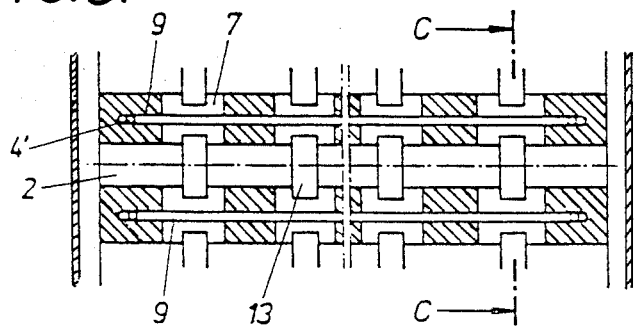
Figure 5A:
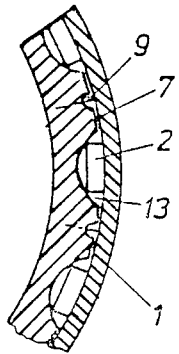
Figure 6:
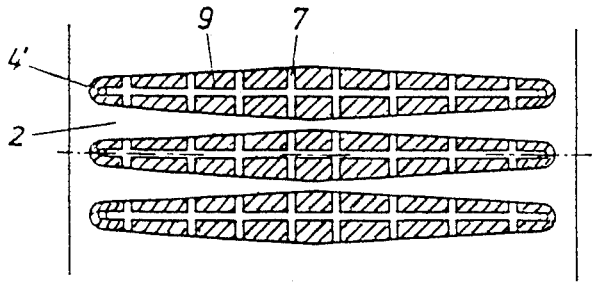
Figure 7:
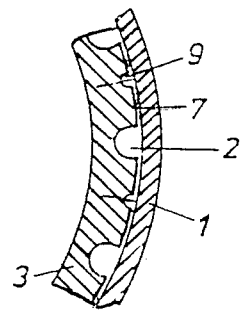
Figure 8:
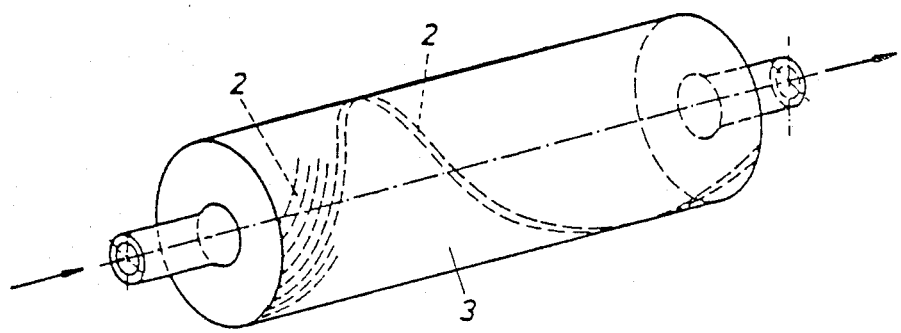
Figure 8A:
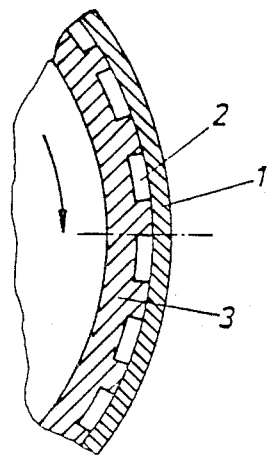
Figure 9:
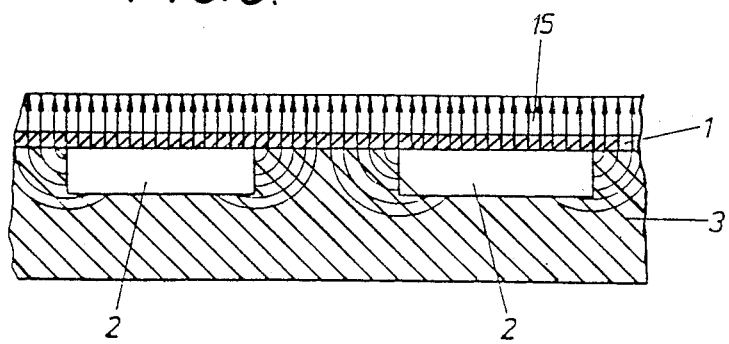
Figure 15A:
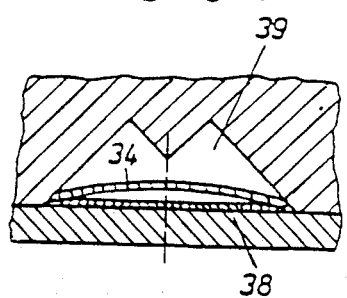
Figure 15B:
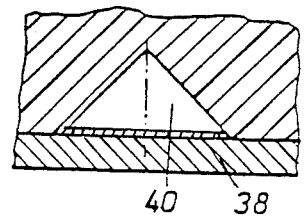
Figure 15C:
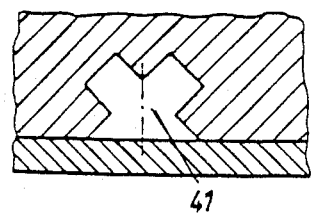
Figure 15D:
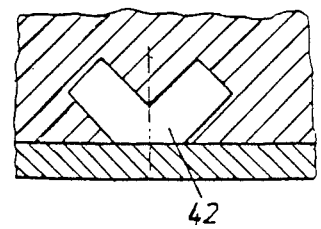
Figure 24:
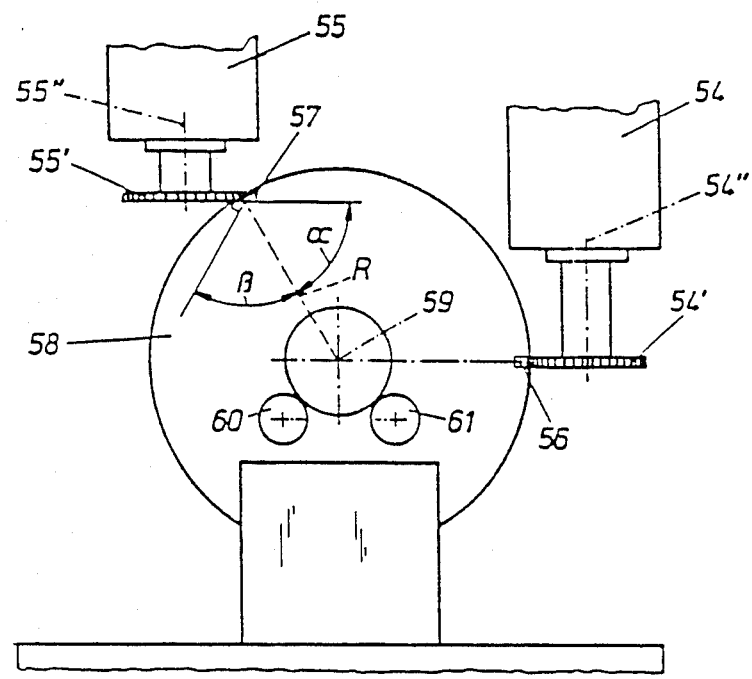
Figure 25:
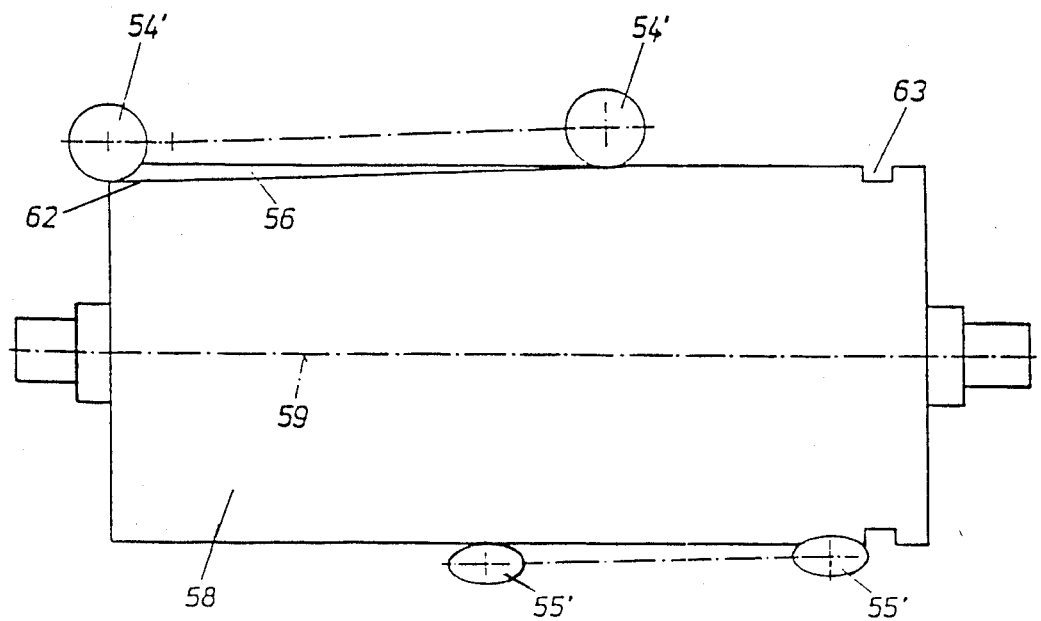

In particular, the individual Figures of the drawings, depict the following:

FIG. 1 is a lengthwise section through a heated cylinder or roll, especially for papermaking machines;

FIG. 1a is a cross-sectional view through the heated cylinder of FIG. 1;

FIG. 2 is a lengthwise section through a cylinder or roll having a raised portion or protuberance in the grooves;

FIG. 2a is an enlarged detail view of the region A shown in FIG. 2;

FIGS. 2b and 2c depict different constructions of raised portions or protuberances;

FIG. 3 is a lengthwise section through a modified construction of cylinder or roll;

FIG. 3a is a cross-section through the cylinder depicted in FIG. 3, taken substantially along the line A—A;

FIG. 3b is a view of the jacket or shell of the cylinder or roll after removal of the outer jacket according to the showing of FIGS. 3 and 3a;

FIGS. 3c and 3d are detail views at the regions B and C, respectively, of the cross-sections indicated by the sectional lines B—B and C—C of the cylinder or roll depicted in FIGS. 3, 3a and 3b;

FIGS. 4 and 4a illustrate an embodiment of a cylinder or roll with lengthwise grooves and circumferential grooves of the same depth;

FIGS. 5 and 5a illustrate an embodiment of a cylinder or roll with lengthwise grooves and circumferential grooves having different depths;

FIG. 6 illustrates an embodiment of an arrangement of grooves and condensate outflow grooves;

FIG. 7 illustrates a section through a cylinder or roll having in cross-section arcuate- or circular-shaped lengthwise grooves and condensate outflow grooves;

FIG. 8 illustrates a cylinder or roll with helically extending lengthwise grooves;

FIG. 8a illustrates a section through the cylinder or roll according to FIG. 8;

FIG. 9 is a schematic diagram of the heat distribution;

FIGS. 10a and 10b show grooves which have a varying or altering cross-section throughout their length;

FIGS. 10c to 10e show different cross-sections of the groove along the section lines I—I, II—II and III—III, respectively, of the illustration of FIG. 10b;

FIGS. 11 to 23d depict further details of sections or cross-sections at the groove region which are generally provided with heated work surfaces, and wherein, in particular:

FIGS. 11, 12, 13a, 13b, 14, 15a, 15b, 16a, 16b, 17, 18a, 18b, 19a, 19b, 20a, 21a, 22a and 23a depict groove cross-sections at the inlet region of the heat carrier medium;

FIGS. 13c, 15c, 16c, 18c, 19c, 20b, 20c, 21b, 22b, 23b and 23c depict groove cross-sections at the intermediate or central region or in the transition zone of the grooves;

FIGS. 13d, 15d, 18d, 19d, 20d, 21c, 22c and 23d depict groove cross-sections at the outlet side or at the end region of the groove; and FIGS. 24 and 25 illustrate an arrangement which shows the possible fabrication or manufacture of grooves or the like and supplementary grooves in a workpiece or base body such as the core cylinder of a heated cylinder.

Preferably between the inlet regions, the intermediate or transition zones and the outlet side or end regions of the depicted grooves there is a continuous or continual change of the cross-sectional dimension or the cross-sectional form or a continuous transition from an illustrated cross-sectional form to the following (depicted) cross-sectional form or size, viewed in the flow direction of the heat carrier medium, wherein the illustrated and provided continuous or continual cross-sectional changes serve for the entrainment of steam condensate, the regulation of the condensate film thickness as well as the pressure regulation. A cross-sectional enlargement means a larger heating surface, a cross-section reduction a larger flow velocity of the heat carrier or transfer medium, especially steam.

DETAILED DESCRIPTION OF THE PREFERRED EMBODIMENTS

Describing now the drawings, there will be considered purely by way of illustration exemplary embodiments of heated cylinders or rolls, especially for paper-making machines in detail. Turning attention now to FIGS. 1 and 1a, FIG. 1 shows a lengthwise section and FIG. 1a a cross-section through a cylinder or roll having a core cylinder 3 defining an axis 3A. Drawn onto the core cylinder 3 is an outer jacket or shell 1 after there have been machined in the core cylinder 3 lengthwise grooves or groove members 2, or the like. By means of a line or conduit 4 inlet regions 2A of the lengthwise grooves 2 are provided with steam which is infed by an axial line or conduit 6 to the cylinder or roll. By means of an outlet region 2B and an outlet line or conduit 4' and a collecting line or conduit 6' there is withdrawn the steam and the formed condensate. The steam infed into the lengthwise grooves 2, condenses at the outer jacket or shell 1. Therefore, according to the showing of FIGS. 2, 2a, 2b and 2c measures or facilities are provided to withdraw the condensate in order to optimize the heat transfer to the outer jacket or shell 1 and in order to maintain free from condensate film the surfaces of the core cylinder 3 which bound the lengthwise grooves 2. In this way, there is realized a good heat or thermal energy transfer at the core cylinder 3 at which there is delivered to the outer jacket or shell 1 the heat or thermal energy by means of its contact surface 14 (see also FIG. 4a).

To obtain an optimum removal of the condensate, there are provided at the end regions of the lengthwise grooves 2, where such merge with the steam outlet or withdrawal lines 4', weir-like protuberances or raised portions 7'. These protuberances or raised portions 7' constrict the lengthwise grooves 2 at a continuous transition (FIG. 2a) to form a slit or slot 8. Forwardly of the slits or slots 8, condensate which has collected at the inner surface of the outer jacket or shell 1 is entrained and withdrawn by the slip-through steam into the associated steam outlet or withdrawal line or conduit 4', so that there can only form a condensate film of predeterminate, in particular small thickness at the inner surface of the outer jacket or shell 1. The function of the protuberances or raised portions 7' in terms of entraining the condensate, and regulating the film thickness and the pressure, can be particularly well realized with the protuberances or raised portions 7' depicted in FIGS. 2b and 2c and which possess a nozzle-shaped configuration or course. In the showing of FIG. 2b the inner situated flank, and in the showing of 2c both of the flanks of the protuberance 7' are rounded or possess a continuously curved ascending and descending portion, respectively.

FIG. 3 depicts a lengthwise section through a cylinder of a different embodiment of the invention. Within a bearing ring 5 of the cylinder or roll there is arranged the substantially ring-shaped or annular line or conduit 6 for the infeed of steam, from which there is infed by means of the line or conduit 4 steam into the lengthwise grooves 2 which extend between two end faces 3B of the core cylinder 3. FIG. 3 illustrates, as also apparent from FIG. 3a, at the left-hand portion of the drawing a section through a lengthwise groove 2 and at the right-hand portion of the illustration a section through a condensate outflow or withdrawal groove 9 provided between the lengthwise grooves 2. As will be apparent from the illustration of FIG. 3b, the additional grooves defining the condensate outflow grooves 9 alternate with the lengthwise grooves 2 which continuously narrow or constrict towards the cylinder center and are connected with such lengthwise grooves 2 by further additional grooves defining channels or circumferential grooves 7 which extend in the circumferential or transverse direction, respectively, over the core cylinder 3.

The condensate which forms at the inner surface of the outer jacket or shell 1 and in the lengthwise grooves 2, respectively, is forced or pressed by the steam pressure and by means of the circumferential grooves 7 into the condensate outflow grooves 9. The circumferential grooves 7 are of relatively thin construction, in particular the circumferential grooves 7 form slots or slits, the base of which is located radially further towards the outside than the groove base of the lengthwise grooves 2. In particular, the base or floor of the circumferential grooves 7 is located slightly beneath the inner surface of the outer jacket or shell 1, and the circumferential grooves 7 are bounded by such towards the outside.

Equally, it is advantageous if the groove base of each of the condensate outflow grooves 9 is located radially further towards the outside than the groove base of each of the lengthwise grooves 2, however lower or deeper than the groove base of each of the circumferential grooves 7. The condensate which has been pressed into the condensate outflow grooves 9 is then withdrawn by appropriate outflow or withdrawal lines or conduits 4' (FIGS. 3, 3a and 3d) and collecting lines or conduits 6' which belong to a condensate outflow system. There can be in particular provided an arrangement wherein the lengthwise grooves 2 do not possess any own steam withdrawal line or conduit themselves, rather that all steam infed at the lateral ends of the lengthwise grooves 2 is withdrawn by the condensate outflow grooves 9 in the form of condensate and steam.

FIG. 3c illustrates the inflow of the steam into a lengthwise groove 2, and there will be recognized the slot or slit of the transversely extending circumferential grooves 7 and which open into the lengthwise groove 2.

FIG. 3d illustrates a section through the steam outlet of a condensate outflow groove 9 via the associated line or conduit 4', and there will be recognized the slots or slits of the circumferential grooves 7 which open into the condensate withdrawal groove 9. Reference character 10 illustrates a ring-shaped or annular line for the infeed of steam to the lengthwise grooves 2 which thus are supplied from both sides of the core cylinder 3 with steam. The withdrawal of the steam is accomplished exclusively by means of the condensate outflow grooves 9. In FIG. 3d there will be recognized the slits or slots of the circumferential groove 7 which open into the condensate outflow groove 9. FIGS. 3 and 3a reveal schematically the central steam supply, and the steam is distributed in a star-shaped configuration from the radial infeed line or conduit 6 to the lengthwise grooves 2, and the steam is conducted into the ring-shaped or annular line 10 possibly provided about the periphery of the core cylinder 3. The arrows indicate the course of the steam and condensate flow.

FIGS. 4 and 4a depict a cylinder in which the axially extending grooves 2 and the circumferential grooves 7 extending in circumferential direction are structured to be of the same depth, so that of the core cylinder 3 there remain ribs or islands 14 which are contacted with the outer jacket or shell 1. Furthermore, in several or all of the remaining ribs or islands 14 there are formed for the purpose of condensate outflow or removal condensate outflow grooves 9 which extend in the circumferential direction of the cylinder. These ribs or islands 14 withdraw the thereto delivered condensate-steam mixture by means of the condensate outflow lines or conduits 4' which open thereinto.

The condensate outflow grooves 9 each have a groove base which is situated appreciably further radially outwardly than the groove base of each of the lengthwise grooves 2 and the circumferential grooves 7, respectively. Due to the improved steam distribution the heat distribution or the heat transfer at the outer jacket or shell 1 is improved.

FIGS. 5 and 5a show in top plan view and in section, respectively, an embodiment of a cylinder or roll wherein condensate outflow or withdrawal grooves 9 are formed between the lengthwise grooves 2. The condensate outflow grooves 9 open into condensate outflow or withdrawal lines or conduits 4' and are connected with the lengthwise grooves 2 by circumferential grooves 7 which are disposed slightly beneath the outer jacket or shell 1. The circumferential grooves 7, which are interrupted by the lengthwise grooves 2, are connected by cavities or recesses 13 in order to improve the steam and condensate flow. FIG. 5a illustrates a cross-section through the circumferential grooves 7 and cavities or recesses 13.

FIG. 6 illustrates an embodiment having lengthwise grooves 2 which constrict or narrow in axial direction. These lengthwise grooves 2 communicate by relatively narrow circumferential grooves 7 with the condensate outflow grooves 9 which extend between the lengthwise grooves 2 and such condensate outflow grooves 9 lead to the condensate outflow or withdrawal lines or conduits 4'.

Just as was the case for the illustration of FIGS. 4 and 5 also in FIG. 6 there have been indicated with crosshatching the surfaces of the core cylinder 3 which are in contact with the outer jacket or shell 1.

FIG. 7 illustrates a section through partially circular-shaped or arcuate lengthwise grooves 2 and partially circular-shaped or arcuate condensate outflow grooves 9, respectively, which are connected by circumferential grooves 7.

FIG. 8 illustrates lengthwise grooves 2 which substantially extend parallel to one another and in helical configuration about a core cylinder 3. Correspondingly, but however not illustrated, the condensate outflow grooves 9 can again extend between the lengthwise grooves 2 provided that there is not selected, for instance, a design according to FIGS. 4 and 4a for the condensate withdrawal. FIG. 8a illustrates a section through FIG. 8.

FIG. 9 schematically illustrates the distribution of the heat or thermal energy which is delivered by the steam and which is infed through the lengthwise grooves 2 in the core cylinder 3. The heat is delivered to the outer jacket or shell 1 and from such location to the material 15 which is to be heated or dried.

FIGS. 10a and 10b show grooves having cross-sections or cross-sectional configurations similar to the designs of FIGS. 2, 3b and 6, the cross-sectional configuration altering over their lengthwise extent or in the throughflow direction, respectively. FIG. 10a shows a groove 2 having increasing cross-sectional area, whereas FIG. 10b shows a groove 2 having decreasing cross-sectional area. The cross-sectional changes of a rectangular, rounded, trapezoidal or triangular-shaped groove 2 according to FIG. 10b have been portrayed in FIGS. 10c, 10d and 10e. FIG. 10c shows sections along the section plane or line I—I, FIG. 10d sections along the section plane or line II—II and FIG. 10e sections along the section plane or line III—III of FIG. 10b. With essentially constant contact surface with the outer jacket or shell the height of the groove continuously reduces, if desired in fact uniformly continuously reduces. During the fabrication of the cylinders or rolls there is accomplished the procedure that the core cylinder 3 is either taken out of already available roll bodies which are no longer suitable as pressure bodies or, however, are fabricated as steel structures with discs and plugs according to the existing state of the art. With the present invention, it is noted that the internal lathe or turning work, which was unavoidable heretofore with present state-of-the-art for uniform heat distribution is not required.

The roll body is received upon a table borer or a combined lathe milling machine and by means of a disc miller the grooves are machined in the core cylinder. In this connection when using numerically controlled machines there can be formed wall thickness differences or a helixing of the lengthwise grooves. As the next working operation there is accomplished the round or circular grinding, and in this working operation there are also ground the slots or slits for the condensate film regulation. Thereafter the outer jacket or shell 1 is drawn in a hot condition or state onto the core cylinder 3, so that the ribs or islands 14 ground to a predeterminate diameter come into pure metallic contact with the outer cylinder.

Such type of cylinders are particularly suitable for drying and calendering cellulose or polymer webs.

A uniform formation of the condensate film thickness is obtained by grooves machined in circumferential direction, particularly grooves having their groove base higher situated, since during increase of the thickness of the condensate film over the height of such relatively flat grooves the condensate, because of the withdrawn slipped-through steam, is entrained for such length of time and escapes through the condensate outflow grooves, until the condensate film thickness has reduced to such an extent that the slip-through steam can escape or be withdrawn without entraining condensate or an established steam-condensate mixture.

As a function of the desired condensate film thickness there is thus machined the depth of the relevant grooves.

It is of advantage that the pressure spaces of the cylinder within the outer jacket or shell 1 are located however, at the same time externally of the core cylinder 3, so that the core cylinder 3 need not be constructed as a pressure body.

Advantageously, the different types of grooves at a core cylinder possess in each case mutually equal widths. The lengthwise grooves 2 advantageously terminate at a joint or separation location between the outer jacket or shell 1 and the core cylinder 3.

In particular, it is advantageous when the cylinders should be mechanically loaded, for instance by doctor blades or contact rolls, that the lengthwisely extending grooves 2 and 9, respectively, are structured to possess a helical or spiral configuration having a pitch angle of about 10° to 30°. In this way there can be obtained a distribution of the contact forces by an at least partial supporting of the outer jacket upon the dimensionally-stable core cylinder and the ribs thereof along the momentary load line, as has been schematically depicted in FIG. 8.

By virtue of the invention, there is rendered possible an optimum heat transfer due to the higher heat transition, the higher steam temperatures and the higher pressures.

By virtue of the improved heat transfer capability there can be realized an increase in the production of the relevant machines at which the cylinders or rolls are employed.

The embodiments of heated cylinders or rolls depicted in FIGS. 10a to 10e are similar to the construction of FIGS. 1 and 3, respectively, wherein, however, viewed in the flow direction of the heat carrier medium (see the arrows), the height of the grooves 2 over their entire length either continuously increases (FIG. 10a) or continuously decreases (FIG. 10b) or the groove cross-section continually decreases (see FIGS. 10c, 10d, 10e in conjunction with FIG. 10b). These grooves can have throughout rectangular cross-sections (uppermost row of the showing of FIGS. 10c to 10e), partially circular cross-sections (second row of the illustration of FIGS. 10c to 10e), trapezoidal cross-sections (third row of FIGS. 10c to 10e) or triangular cross-sections (lowermost row of FIGS. 10c to 10e). As already previously mentioned, due to the enlargement of the cross-section (FIG. 10a) there is obtained an increase of the heating surface, due to the reduction of the cross-section (FIGS. 10b to 10e) there is obtained a greater flow velocity of the heat carrier medium, and consequently, there can be differently influenced the available thermal energy at the work surface.

FIGS. 11 to 23d illustrate further possibilities for influencing the heat transfer from a base body 16, for instance a heated core cylinder, to an outer surface layer 18 carrying the work surface 17, especially to a sheet metal plating or the like, for instance a cylindrical jacket or shell. This cylindrical jacket or shell is seated to be directly metallically contacting or else while interposing a good thermally conductive transition layer, for instance heat-conducting paste, upon the base body 16, for instance a core cylinder. This base body 16 and outer surface layer 18 can be, as here illustrated, constructed, for instance, planar for heated molds or press plates, but also can be curved, for instance for heated cylinders or rolls.

FIG. 11 shows grooves 19 having trapezoidal-shaped cross-section, FIG. 12 illustrates grooves 22 having angle-shaped cross-section with communicating groove portions 22A and 22B.

According to the showing of FIGS. 13a, 13b, 13c and 13d, lengthwise grooves having rectangular cross-section in an inlet region 23, 23' merge with or into grooves of lesser height and having supplementary, i.e. branched angular grooves 25 in the groove flanks at the groove central or intermediate portion or region 23 and finally with or into angle-shaped grooves 28 in the outlet side or region 28A of the lengthwise grooves for through-passing the heat carrier medium. This transition advantageously is gradually accomplished.

These FIGS. 13a to 13d furthermore show the possibility of providing supplementary heat damming or dam-up grooves 27 and 27' at the inlet region and arranged adjacent the main or primary, i.e. lengthwise grooves. The lengthwise grooves merge at the center or intermediate region B" of the groove length with the branched angular grooves 25 and at the outlet side or region 28A with or into the angle-shaped grooves 28. Also in this case, such transition is advantageously gradually or continually accomplished.

According to the illustration of FIG. 14 the groove 30, which as viewed in the flow direction of the medium, possesses different height or different width, is provided at the inlet region, for heat damming or dam-up purposes in order to form condensate, with a metal strip 34 at the groove opening 31 which, in this case, can be somewhat widened at location 32, 33. This metal strip or strip member 34, can be utilized, for instance, only at the inlet region. Such metal strips 34 serve for heat damming by condensate formation and generally influence the heat transfer or transition to the work surface 17 from the heat carrier medium or base body 16, and there is also present the influence of the cross-sectional change of the groove shape.

The variant embodiment of FIGS. 15a to 15d also use metal strips or strip members 34, however in combination with insulation strips or strip members 38 and other groove cross-sections. It will be seen that these different groove cross-sections specifically comprise grooves of double triangular shape (FIG. 15a) or triangular shape (FIG. 15b) at the groove starting portion or inlet region 39 or 40, a cut cross-shaped or X-like configuration (FIG. 15c) at the groove central or intermediate region 41 as well as again an angle-shape at the outlet side or outlet region 42. Also in this case, there should be advantageously employed gradual transitions of the individual cross-sectional shapes into the subsequent shape.

Figure 16A:
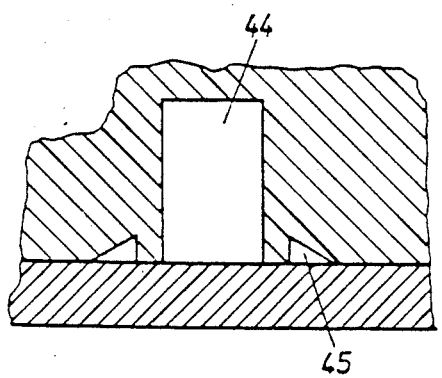
Figure 16B:
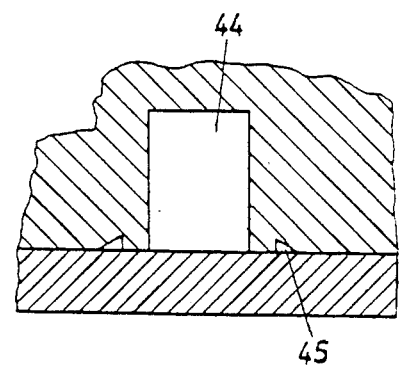
Figure 16C:
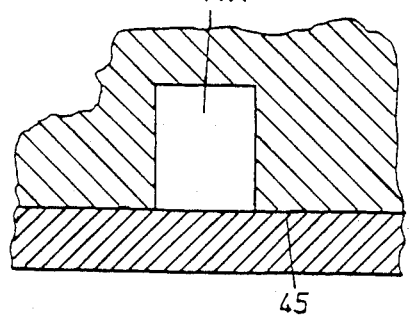
Figure 17:
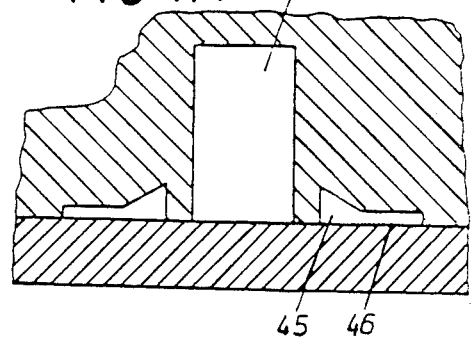

FIGS. 16a, 16b, 16c and 17 show supplementary grooves 45 of substantially triangular cross-section arranged adjacent lengthwise grooves of substantially rectangular cross-sectional shape. In particular, FIGS. 16a and 16b show at the inlet region 44 of the groove starting portion and FIG. 16c at the transition zone or intermediate region 44A, in other words with clearly reduced cross-section, the heat damming or dam-up supplementary groove 45. According to the illustration of FIG. 17, the supplementary grooves 45 can have a widened portion 46, for instance, by performing a manual grinding operation and thus, the heat damming action can be additionally increased at the groove inlet region or starting portion 44.

Figure 18A:
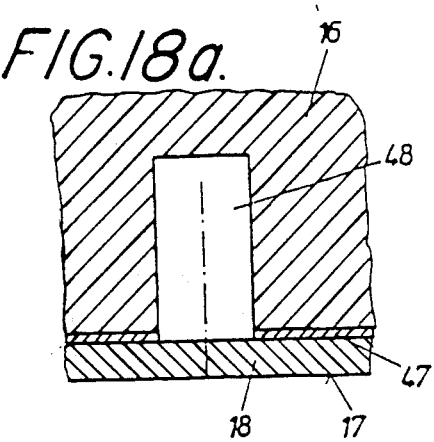
Figure 18B:
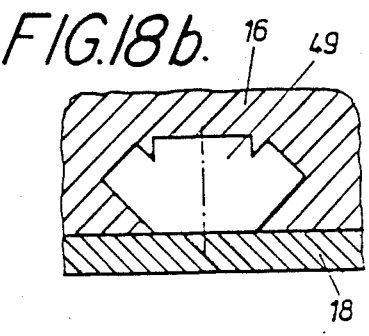
Figure 18C:
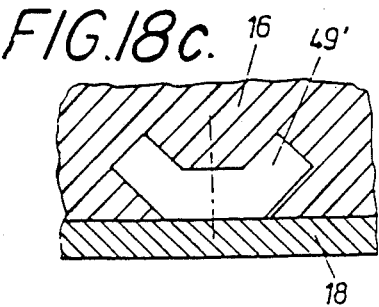
Figure 18D:
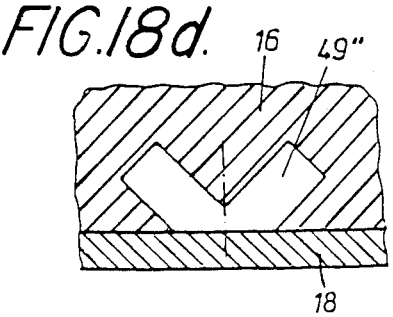

As already explained, heat damming or blocking and thus the heat transfer to the work surface also can be influenced by appropriately configuring the contact surfaces between the base body and the outer surface layer, for instance by roughening or rough turning of such contact surfaces. The embodiment of FIGS. 18a to 18d shows such variant. In the illustration of FIG. 18a at location 47 the contact surface of the base body 16 is rough machined or turned. In this regard, reference is made to the groove starting portion or inlet region 48 having a rectangular cross-sectional configuration which then soon is transformed into or merges with the branched angular configuration according to the illustration of FIG. 18b. This merging groove configuration, as well as its continuation at the central or intermediate region 49' (FIG. 18c) and its continuation in the end or outlet region 49" (FIG. 18d) again possess the supplementary i.e. branched angular grooves at the flank region and the angle-shaped grooves, for the purpose of heat damming.

Figure 19A:
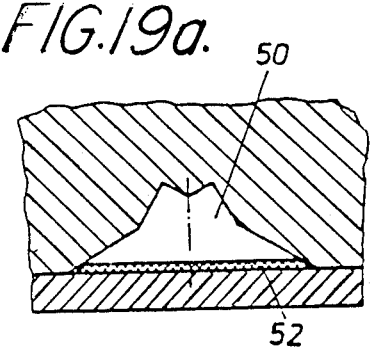
Figure 19B:
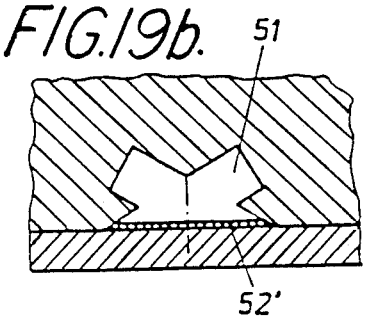
Figure 19C:
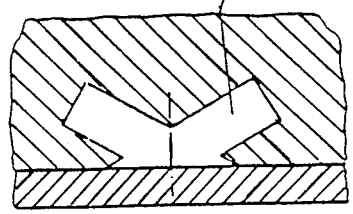
Figure 19D:
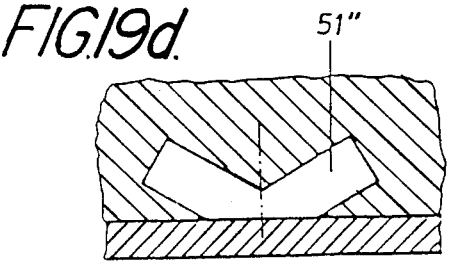
Figure 20A:
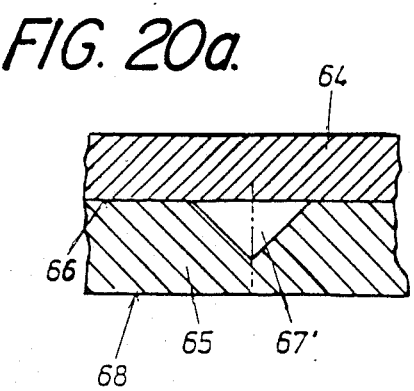
Figure 20B:
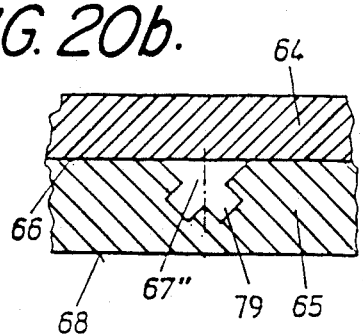
Figure 20C:
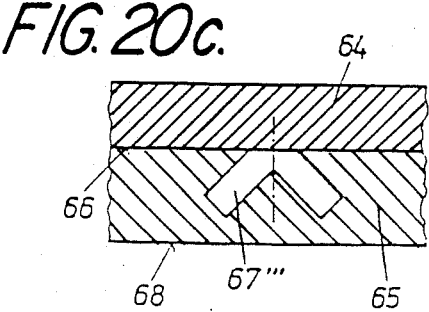
Figure 20D:
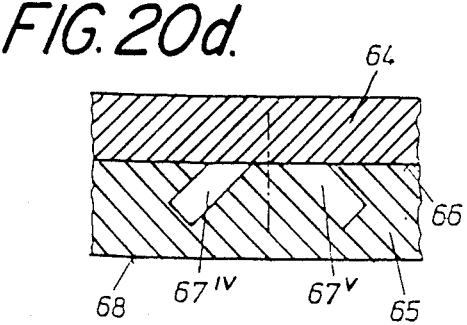

FIGS. 19a to 19d show the transition of an approximately triangular groove structure (FIG. 19a), at the groove starting portion or inlet region 50 into a merged groove configuration 51" having additional recesses at the flanks, i.e. branched angular grooves (FIG. 19b) following the inlet region 50, FIG. 19c at the central or intermediate region or portion 51, FIG. 19d at the groove outlet region or end 51), and to influence the heat damming action there are again provided additional insulation strips or strip members 52, 52' at the inlet region 50 of the groove.

As already heretofore explained, the invention is not limited to embodiments where there are provided control means, especially the grooves and supplementary grooves in the base body, for instance in a core cylinder. Quite to the contrary, such control means, especially the grooves and/or branched angular and angle-shaped grooves also can be arranged in the surface of the outer surface layer which confronts the base body, for instance the core cylinder. There also can be advantageous, especially if it is desired to maintain the groove depth small, that there are provided grooves and/or branched angular and angle-shaped grooves both in the base body, for instance the core cylinder, as well as in the outer surface layer, for instance at the sheet metal plating, and the grooves and/or branched angular and angle-shaped grooves in the base body and/or branched angular angle-shaped grooves in the outer surface layer are superimposed or in registry with respect to one another.

Thus, with reference to FIGS. 20a to 22c there now will be described further exemplary embodiments in which grooves and branched angular and/or angle-shaped grooves, respectively, are provided in the surface of the outer surface layer, for instance an externally located sheet metal plating, confronting the base body, for instance a core cylinder, instead of in the base body. As already mentioned, these embodiments can be generally applied for equipment or apparatus provided with a work surface heated by steam or the like, and therefore also, for instance for planar heated molds, heated press punches, heated press plates, but also for heated cylinders, for instance for papermaking machines.

Starting with FIGS. 20a to 20d such depict in section a cutaway portion or segment of the circumference of a drying cylinder or a press plate. In each case, the reference character 64 denotes the base body, for instance the jacket of a core cylinder, and reference character 65 denotes the outer surface layer, for instance an externally located sheet metal plating, or an outer jacket drawn onto the core cylinder. As control means influencing or regulating the heat transfer from the heat carrier medium, especially steam, to the outer surface layer 65, there are provided grooves and supplementary, i.e. branched angular and angle-shaped grooves, respectively, in the surface 66 of the outer surface layer 65 confronting the base body 64. The groove cross-sections at the inlet region or end 67 for infeedings the medium or steam into the heat carrier groove merge or change from the triangular-shape or triangle-form through a triangular-shape or triangle-form with supplementary, i.e. branched angular grooves 79 in the triangle-flanks as well as an angle-shaped section in the region of the center or intermediate groove region or portion 67 of the groove length gradually into two separate angle-shaped grooves or grooves portions $67^{1V}$ and $67^V$ inclined with respect to the surface 66 of the outer surface layer 65. The grooves have over at least a part, advantageously over the entire part, of their length a continuously, preferably uniformly, changing or varying cross-section. As already mentioned above, with the described design of the lengthwise grooves it is desired to specifically influence or regularize the available heat and/or thermal energy at the outer surface 68.

Figure 21A:
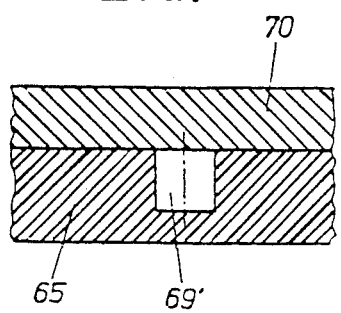
Figure 21B:
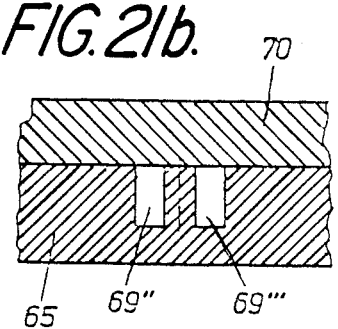
Figure 21C:
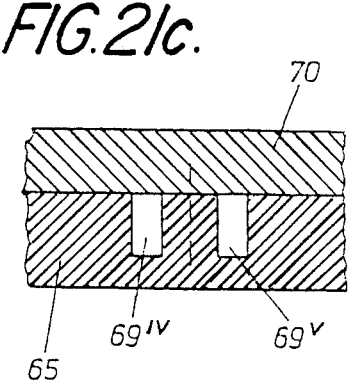

FIGS. 21a to 21c illustrate a further variant with lengthwise grooves 69' to $69^V$ machined in the outer surface layer 65. The base body 70 again does not contain any grooves. In this case, rectangular groove in the inlet region 69' branches in a lengthwise diverging manner during transit to the center or intermediate region of the groove length into two partial or separate branch grooves 69" and 69"'. The spacing between these two partial grooves 69" and 69"' increases right to the groove end region while the groove height remains the same as can be seen at $69^{1V}$ and $69^V$ in FIG. 21c. Also in this case there should be advantageously employed gradual transitions of the groove cross-section.

Figure 22A:
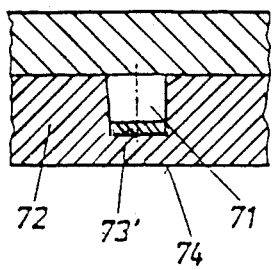
Figure 22B:
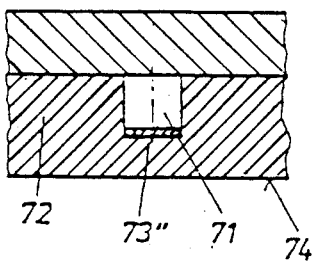
Figure 22C:
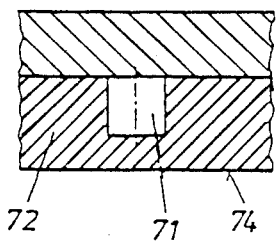
Figure 23A:
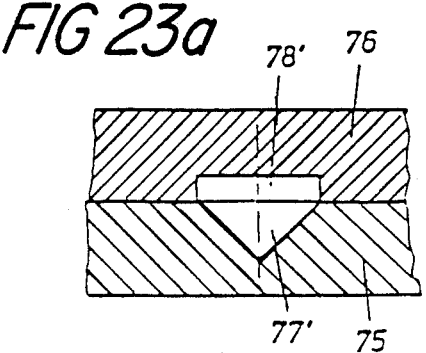
Figure 23B:
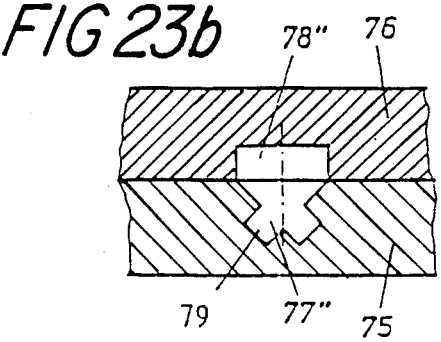
Figure 23C:
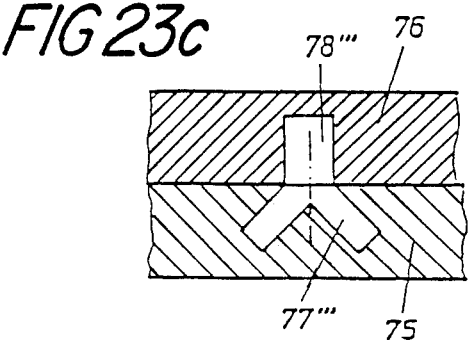
Figure 23D:
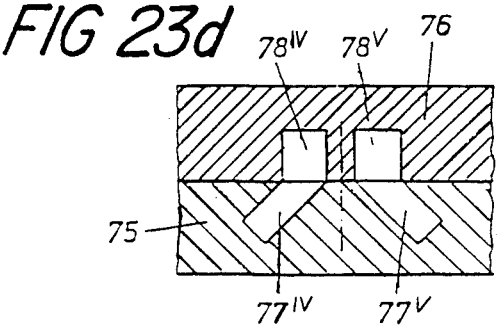

In the embodiment according to FIGS. 22a to 22c, influencing of the heat transfer from the heat carrier medium flowing in the lengthwise groove 71 in the outer surface layer 72 is effected by providing at the groove base insulating strips 73' and 73" of different thicknesses. These insulating strips 73' and 73" also allow the remaining free groove height and accordingly the groove cross-section to increase from the inlet region or side (FIG. 22a) through the center or intermediate region of the groove length (FIG. 22b) to the groove outlet region (FIG. 22c). Since while flowing through the groove 71 the heat carrier medium, for instance the steam, transmits or gives up thermal energy and thus becomes cooler, the good thermally conducting groove metal surface available for the heat transfer thus becomes increasingly larger, so that the available heat or thermal energy at the outer surface is accordingly regulated, particularly made uniform over the lengthwise extent of the outer surface.

As already mentioned above, grooves and supplementary, i.e. branched angular and/or angle-shaped grooves, especially grooves and supplementary grooves corresponding or registering with respect to one another, can be provided both in the base body and in the outer surface layer. Such a further embodiment of the invention can be seen, for example, in FIGS. 23a to FIG. 23d. The base body of a heated press plate or a heated cylinder, of which in each case only a cutaway segment can be seen in sectional illustration, is thereby denoted by the reference character 75. The heat conducting outer surface layer, for instance of metal, which is in good thermally conducting contact with the base body 75, is denoted by the reference character 76. In this case, the lengthwise grooves and their supplementary, i.e. branched angular and/or angle-shaped grooves are located not only in the base body 75 but also in the outer surface layer 76. The grooves 77' to 77$^V$ in the base body 75 again gradually change from the groove inlet region (FIG. 23a) through the central part or intermediate region (FIG. 23b and FIG. 23c) to separate angle-shaped groove parts or portions 77$^{IV}$ and 77$^V$ (FIG. 23d) in the outlet region. In similar manner, this applies for the grooves 78' to 78$^V$ in the outer surface layer 76. In this way, the heat transfer also can be correspondingly regulated, and either larger cross-sections for the medium, especially the steam, can be made available by providing the grooves in the base body 75 and in the outer surface layer 76, or there are taken into account smaller cross-sectional reductions in these parts 75 and 76 for normally small medium passage, as in the embodiments described hereinbefore.

FIG. 24 and 25 illustrate an arrangement which depicts a possibility for the fabrication of the main and supplementary grooves in the core cylinder of a heated cylinder or roll, especially for papermaking machines.

Here there are employed milling machines 54 and 55 having for instance disc millers, especially groups or sets of millers, and specifically for the main or primary grooves 56 there is provided the miller or milling machine 54', and for the supplementary, i.e. branched angular and/or angle-shaped grooves 57 the miller or milling machine 55'. For instance, there can be fabricated grooves according to the showing of FIGS. 13a to 13d, with the exception of the supplementary grooves 27, 27' and FIGS. 18a to 18d. During the milling operation the milling machines 54 and 55 are displaceable transverse to their rotation axis 54" and 55", respectively, in order to produce the relevant grooves as a function of the momentarily desired groove depth. If there are to be fabricated, as in the previously discussed embodiments, supplementary grooves 57 in both flanks of the main or primary grooves 56, then the milling machine 55 not only must be displaceable, but also pivotable, for instance from an angle $\alpha$ of 60° at the one side of the radius R of the core cylinder 58 to an angle $\beta$ of 60° to the other side of the radius R. For the success of fabrication of the grooves the core cylinder 58 is rotated about its lengthwise or rotational axis 59. For this purpose, this core cylinder 58 is mounted, for instance, upon specially driven rolls 60 and 61. Both the main groove 56, for instance with a width of 8 mm, as well as also the additional grooves, for instance with a width of 4 mm, can continuously alter or vary in their depth in the direction of the lengthwise or rotational axis 59 of the core cylinder 58, for instance the main grooves 56 by 3 mm/m, the supplementary grooves 57 by 2 mm/m.

In this regard, reference is made to FIG. 25. The inlet side for the heating steam is designated by reference character 62, and the outlet side by reference character 63. Here there is provided a linear groove cross-sectional change.

At this junction, it is remarked that the base bodies need not be fabricated from one piece. These base bodies can each consist of a number of pieces or elements, for instance plates, which are mutually welded to one another, or by plates carrying such base bodies and which are mutually welded or can comprise plates carrying the base bodies, with which they are welded, and thus interconnected with one another. The grooves can be provided in such plates or the like, or between such plates. The outer surface layer, for instance in the form of a cover plate, is mounted upon such plates or the like, and which then contains at the outer side the work surface which is to be heated. All of these plates can consist of metal, especially steel. However, also base bodies deviating from a cylindrical shape, for instance heated planar or curved press plates or molds, can be formed of one piece, and the grooves and the possibly employed supplementary grooves can be machined in such one-piece base bodies. Also in this case it is conceivable and often advantageous to mount the outer surface layer in the form of a metal plate directly or while placing the good heat-conducting layer, for instance a heat-conducting paste, upon the base body.

According to the invention, one is predominantly concerned with obtaining a constant or essentially constant heat transfer for larger work surfaces or cylinder or roll widths. The accuracy of a constant heat transfer is dependent upon the slip-through steam quantity which, among other things, now is controlled according to the invention. For instance, at the inlet region of the grooves there can be strived for a lower heat transfer in order to avoid, for instance, an overheating at the marginal or edge regions of the paper. According to the invention, there is taken into account that often the different steam velocity over the course or extent of the grooves constitutes the largest disturbing factor, so that the above-explained inventive measures can be provided for controlling such steam velocity. There can be used saturated steam temperatures of 140° to 160° C.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An apparatus containing a work surface heated by a heat carrier medium, comprising:
    a heat-conducting surface layer;
    said work surface being located upon said heat-conducting surface layer;
    a metallic base body;
    said heat-conducting surface layer being carried by said metallic base body and having a surface confronting said metallic base body;
    said metallic base body having a surface confronting said heat-conducting surface layer;
    said surface of said heat-conducting surface layer and said surface of said metallic base body defining two mutually confronting surfaces;
    at least one of said two mutually confronting surfaces being provided with a plurality of lengthwise grooves extending lengthwise of the associated one of the two mutually confronting surfaces;
    each one of said lengthwise grooves having an inlet region for infeeding said heat carrier medium;
    said at least one surface further containing heat transfer reducing means in the region of said inlet region of said lengthwise grooves for reducing heat transfer in said inlet region of said lengthwise grooves;

said heat carrier medium heating said work surface by throughflow of said heat carrier medium through said plurality of lengthwise grooves; and said plurality of lengthwise grooves and said heat damming means constituting control means for regulating heat conduction from said metallic base body to said heat-conducting surface layer and from said heat carrier medium guided in said plurality of lengthwise grooves to at least one of said two confronting surfaces.

2. The apparatus as defined in claim 1, wherein:

said heat damming means comprise a roughened portion provided at said surface of said metallic base body laterally adjacent the inlet region of said lengthwise grooves.

3. The apparatus as defined in claim 1, wherein:

said heat transfer reducing means comprise a metal strip provided in said inlet region of each one of said lengthwise grooves; and said metal strip being laterally mounted in the inlet region of said lengthwise grooves for subdividing each one of said lengthwise grooves in its inlet region in a direction transverse to said inlet region.

4. The apparatus as defined in claim 1, wherein:

said heat transfer reducing means comprise an insulation strip provided in said inlet region of each one of said lengthwise grooves; and said insulation strip being mounted at a groove base in said inlet region of each one of said lengthwise grooves.

5. The apparatus as defined in claim 1, wherein:

each one of said lengthwise grooves comprises an angle-shaped section; and said angle-shaped section containing two groove portions extending transverse from said lengthwise groove and enclosing an angle of less than 180 degrees.

6. The apparatus as defined in claim 5, wherein:

each one of said lengthwise grooves further contains an outlet region for outfeeding either one of (i) said heat carrier medium, (ii) a condensate formed from said heat carrier medium or (iii) both said heat carrier medium and said heat carrier medium condensate, and an intermediate region interconnecting said inlet region and said outlet region;

said angle-shaped section extending from said outlet region of each one of said lengthwise grooves;

said inlet region and said angle-shaped section continually merging with each other following said inlet region of said lengthwise groove which possesses a corresponding continually changing cross-section; and each one of said lengthwise grooves possessing a continually changing cross-section substantially along its entire length.

7. The apparatus as defined in claim 6, wherein:

said angle-shaped section defines branched angular grooves in said intermediate region of said lengthwise groove; and said branched angular grooves extending laterally from and communicating with said lengthwise groove.

8. The apparatus as defined in claim 6, wherein:

said groove portions of said angle-shaped section communicate with each other in the outlet region of each one of said lengthwise grooves.

9. The apparatus as defined in claim 6, wherein:

said groove portions of said angle-shaped section are separate from each other in the outlet region of each one of said lengthwise grooves.

10. The apparatus as defined in claim 5, wherein:

each one of said lengthwise grooves constitutes a single lengthwise groove along a first part of said lengthwise groove; and said angle-shaped section constituting a second part of said lengthwise groove and containing two branch grooves divergingly extending in lengthwise direction from said first part of said lengthwise groove.

11. The apparatus as defined in claim 1, wherein:

said inlet region containing said heat transfer reducing means in each one of said lengthwise grooves selectively has either one of (i) a substantially rectangular or (ii) a substantially triangular cross-section; and said cross section opening in a direction towards the associated one of said two mutually confronting surfaces.

12. The apparatus as defined in claim 1, wherein:

said at least one surface further containing outflow grooves extending substantially parallel to and alternatingly with said lengthwise grooves;

said at least one surface further containing grooves interconnecting said lengthwise grooves and said outflow grooves and extending transverse to said lengthwise grooves and said outflow grooves;

said lengthwise grooves possessing a predetermined depth;

said outflow grooves having a smaller depth than said predetermined depth of said lengthwise grooves;

said transverse grooves having a maximum depth substantially equal to said depth of said outflow grooves; and each one of said outflow grooves serving for selectively outfeeding either one of (i) said heat carrier medium, (ii) a condensate formed from said heat carrier medium, or (iii) both said heat carrier medium and said heat carrier medium condensate.

13. The apparatus as defined in claim 1, wherein:

said metallic base body constitutes a core cylinder;

said heat-conducting surface constitutes a cylinder jacket; and said lengthwise grooves extend in a helical configuration of a predeterminate pitch along at least one of said two mutually confronting surfaces.

14. The apparatus as defined in claim 13, wherein:

said predetermined pitch is in the range of 10 to 30 degrees.

15. An apparatus containing a work surface heated by a heat carrier medium, comprising:

a heat-conducting surface layer;

said work surface being located upon said heat-conducting surface layer;

a metallic base body;

said heat-conducting surface layer being carried by said metallic base body and having a surface confronting said metallic base body;

said metallic base body having a surface confronting said heat-conducting surface layer;

said surface of said heat-conducting surface layer and said surface of said metallic base body defining two mutually confronting surfaces;

at least one of said two mutually confronting surfaces being provided with a plurality of lengthwise grooves extending lengthwise of the associated one of said two mutually confronting surfaces;

the heat carrier medium heating said work surface by throughflow of said heat carrier medium through said plurality of lengthwise grooves;

said plurality of lengthwise grooves constituting control means for regulating heat conduction from said metallic base body to said heat-conducting surface layer and from said heat carrier medium guided in said plurality of lengthwise grooves to at least one of said two confronting surfaces;

branched angular grooves extending from said lengthwise grooves;

said branched angular grooves extending along at least part of the length of said lengthwise grooves;

transverse grooves provided in at least one of said two mutually confronting surfaces and extending transverse from said lengthwise grooves; and said branched angular grooves having over at least a part of their length a changing cross-section.

16. The apparatus as defined in claim 15, wherein: said branched angular grooves extending from said lengthwise grooves possess over at least a part of their length a continuously changing cross-section.

17. The apparatus as defined in claim 15, wherein: said branched angular grooves extending from said lengthwise grooves possess over at least a part of their length a uniformly changing cross-section.

18. The apparatus as defined in claim 15, wherein: said branched angular grooves of said lengthwise grooves and said lengthwise grooves have substantially rectangular, cross-section.

19. The apparatus as defined in claim 15, wherein: said lengthwise grooves have a cross-section which increases towards the associated one of the two mutually confronting surfaces.

20. The apparatus as defined in claim 15, wherein: each one of said lengthwise grooves possesses an inlet region for infeeding said heat carrier medium; and said branched angular grooves being in spaced relationship from said inlet region of said lengthwise grooves and changing over to angle-shaped grooves extending along at least part of the length of the lengthwise grooves.

21. The apparatus as defined in claim 20, wherein: each one of said lengthwise grooves possesses an outlet region; and said angle-shaped grooves of said lengthwise grooves being provided in said outlet region of said lengthwise grooves.

22. The apparatus as defined in claim 20, wherein: said angle-shaped grooves constitute separate grooves enclosing an angle of less than 180 degrees.

23. The apparatus as defined in claim 15, wherein: each one of said lengthwise grooves possesses an inlet region for infeeding said heat carrier medium; said branched angular grooves are provided in a spaced relationship from said inlet region of said lengthwise grooves; and said branched angular grooves enclosing an angle of less than 180°.

24. The apparatus as defined in claim 15, wherein: each one of said lengthwise grooves possesses an outlet region; and said branched angular grooves extend towards said outlet region of said lengthwise grooves; and said branched angular grooves enclosing an angle of less than 180°.

25. The apparatus as defined in claim 15, wherein: said lengthwise grooves continuously change their cross-section, as viewed in a predeterminate flow direction of said heat carrier medium, from an inlet region through an intermediate region containing said branched angular grooves to an outlet region of said lengthwise grooves.

26. The apparatus as defined in claim 25, wherein: said inlet region has a substantially rectangular configuration.

27. The apparatus as defined in claim 25, wherein: said inlet region has a substantially triangular configuration.

28. The apparatus as defined in claim 25, wherein: said inlet region has a substantially trapezoidal configuration.

29. The apparatus as defined in claim 25, wherein: said outlet region has an angle-shaped cross-sectional configuration.

30. The apparatus as defined in claim 15, wherein: said branched angular grooves constitute two branched angular grooves extending laterally from and communicating laterally with said lengthwise grooves.

31. The apparatus as defined in claim 15, wherein: said branched angular grooves constitute angle-shaped grooves containing separate branch grooves extending lengthwise from a predeterminate location of the associated lengthwise grooves in a diverging manner.

32. The apparatus as defined in claim 15, wherein: part of each one of said lengthwise grooves is provided in the surface of said metallic base body; a remaining part of each one of said lengthwise grooves is provided in the surface of said heat-conducting surface layer; and said parts of said lengthwise grooves provided in said base body surface and said remaining parts of said lengthwise grooves provided in said surface of said heat-conducting surface layer are superimposed and in registry with respect to one another.

33. An apparatus containing a work surface heated by a heat carrier medium, comprising:
a heat-conducting surface layer;
said work surface being located upon said heat-conducting surface layer;
a metallic base body;
said heat-conducting surface layer being carried by said metallic base body and having a surface confronting said metallic base body;
said metallic base body having a surface confronting said heat-conducting surface layer;
said surface of said heat-conducting surface layer and said surface of said metallic base body defining two mutually confronting surfaces;
at least one of said two mutually confronting surfaces being provided with a plurality of lengthwise grooves extending lengthwise of the associated one of said two mutually confronting surfaces;
the heat carrier medium heating said work surface by throughflow of said heat carrier medium through said plurality of lengthwise grooves;
said plurality of lengthwise grooves constituting control means for regulating heat conduction from said metallic base body to said heat-conducting surface layer and from said heat carrier medium guided in said plurality of lengthwise grooves to at least one of said two confronting surfaces;

branched angular grooves extending from said lengthwise grooves;

supplementary grooves arranged laterally adjacent said lengthwise grooves and provided in at least one of said two mutually confronting surfaces and extending along at least part of the length of said lengthwise grooves;

transverse grooves provided in at least one of said two mutually confronting surfaces and extending transverse from said lengthwise grooves;

metal strips provided in said lengthwise grooves; and said branched angular grooves and said supplementary grooves adjacent said lengthwise grooves having over at least a part of their length a changing cross-section.

34. The apparatus as defined in claim 33, wherein:
said supplementary grooves adjacent said lengthwise grooves have substantially triangular cross-section.

35. The apparatus as defined in claim 33, wherein:
each one of said lengthwise grooves possesses an inlet region for infeeding said heat carrier medium;
said supplementary grooves are arranged adjacent said inlet region of said lengthwise grooves;
said supplementary grooves opening into an associated one of said two mutually confronting surfaces; and
said supplementary grooves containing a widened portion.

36. The apparatus as defined in claim 35, wherein:
said supplementary grooves possess a substantially triangular cross-sectional configuration.

37. The apparatus as defined in claim 33, wherein:
said lengthwise grooves are provided with an inlet region for infeeding said heat carrier medium; and
said metal strips bridging associated openings in respective ones of said inlet regions of said lengthwise grooves.

38. An apparatus containing a work surface heated by a heat carrier medium, comprising:
a heat-conducting surface layer;
said work surface being located upon said heat-conducting surface layer;
a metallic base body;
said heat-conducting surface layer being carried by said metallic base body and having a surface confronting said metallic base body;
said metallic base body having a surface confronting said heat-conducting surface layer;
said surface of said heat-conducting surface layer and said surface of said metallic base body defining two mutually confronting surfaces;
at least one of said two mutually confronting surfaces being provided with a plurality of lengthwise grooves extending lengthwise of the associated one of said two mutually confronting surfaces;
the heat carrier medium heating said work surface by throughflow of said heat carrier medium through said plurality of lengthwise grooves;
said plurality of lengthwise grooves constituting control means for regulating heat conduction from said metallic base body to said heat-conducting surface layer and from said heat carrier medium guided in said plurality of lengthwise grooves to at least one of said two confronting surfaces;
branched angular grooves extending from said lengthwise grooves;
supplementary grooves arranged laterally adjacent said lengthwise grooves and provided in at least one of said two mutually confronting surfaces and extending along at least part of the length of said lengthwise grooves;
said lengthwise grooves possessing an inlet region for infeeding said heat carrier medium;
said surface of said metallic base body being provided with a roughened portion at least in the region of said inlet region of said lengthwise grooves;
transverse grooves provided in at least one of said two mutually confronting surfaces and extending transverse from said lengthwise grooves;
metal strips provided in said lengthwise grooves at least in said inlet region of said lengthwise grooves; and
said branched angular grooves and said supplementary grooves adjacent said lengthwise grooves having over at least a part of their length a changing cross-section.

39. An apparatus containing a work surface heated by a heat carrier medium, comprising:
a heat-conducting surface layer;
said work surface being located upon said heat-conducting surface layer;
a metallic base body;
said heat-conducting surface layer being carried by said metallic base body and having a surface confronting said metallic base body;
said metallic base body having a surface confronting said heat-conducting surface layer;
said surface of said heat-conducting surface layer and said surface of said metallic base body defining two mutually confronting surfaces;
at least one of said two mutually confronting surfaces being provided with a plurality of lengthwise grooves extending lengthwise of the associated one of said at least two mutually confronting surfaces;
the heat carrier medium heating said work surface by throughflow of said heat carrier medium through said plurality of lengthwise grooves;
said plurality of lengthwise grooves constituting control means for regulating heat conduction from said metallic base body to said heat-conducting surface layer and from said heat carrier medium guided in said plurality of lengthwise grooves to at least one of said two confronting surfaces;
branched angular grooves extending from said lengthwise grooves;
supplementary grooves arranged laterally adjacent said lengthwise grooves and provided in at least one of said two mutually confronting surfaces and extending along at least part of the length of said lengthwise grooves;
said lengthwise grooves possessing an inlet region for infeeding said heat carrier medium;
said surface of said metallic base body being provided with a roughened portion at least in the region of said inlet region of said lengthwise grooves;
transverse grooves provided in at least one of said two mutually confronting surfaces and extending transverse from said lengthwise grooves;
metal strips provided in said lengthwise grooves at least in said inlet region of said lengthwise grooves;
said branched angular grooves and said supplementary grooves arranged adjacent said lengthwise grooves having over at least a part of their length a changing cross-section; and said heat-conducting surface layer comprising different materials.

40. An apparatus containing a work surface heated by a heat carrier medium, comprising:

a heat-conducting surface layer;

said work surface being located upon said heat-conducting surface layer;

a metallic base body;

said heat-conducting surface layer being carried by said metallic base body and having a surface confronting said metallic base body;

said metallic base body having a surface confronting said heat-conducting surface layer;

said surface of said heat-conducting surface layer and said surface of said metallic base body defining two mutually confronting surfaces;

at least one of said two mutually confronting surfaces being provided with a plurality of lengthwise grooves extending lengthwise of the associated one of the two mutually confronting surfaces;

each one of said lengthwise grooves having an inlet region for infeeding said heat carrier medium;

said at least one surface further containing heat transfer reducing means at least in the region of said inlet region of said lengthwise grooves;

said heat carrier medium heating said work surface by throughflow of said heat carrier medium through said plurality of lengthwise grooves;

said plurality of lengthwise grooves and said heat transfer reducing means constituting control means for regulating heat conduction from said metallic base body to said heat-conducting surface layer and from said heat carrier medium guided in said plurality of lengthwise grooves to at least one of said two confronting surfaces; and said heat transfer reducing means comprising supplementary grooves extending laterally adjacent to at least said inlet region of said lengthwise grooves and having a closed end.

41. The apparatus as defined in claim 40, wherein:

said supplementary grooves having over at least a part of their length a changing cross-section.

42. An apparatus containing a work surface heated by a heat carrier medium, comprising:

a heat-conducting surface layer;

said work surface being located upon said heat-conducting surface layer;

a metallic base body;

said heat-conducting surface layer being carried by said metallic base body and having a surface confronting said metallic base body;

said metallic base body having a surface confronting said heat-conducting surface layer;

said surface of said heat-conducting surface layer and said surface of said metallic base body defining two mutually confronting surfaces;

at least one of said two mutually confronting surfaces being provided with a plurality of lengthwise grooves extending lengthwise of the associated one of the two mutually confronting surfaces;

each one of said lengthwise grooves having an inlet region for infeeding said heat carrier medium;

said at least one surface further containing heat transfer reducing means at least in the region of said inlet region of said lengthwise grooves;

said heat carrier medium heating said work surface by throughflow of said heat carrier medium through said plurality of lengthwise grooves;

said plurality of lengthwise grooves and said heat transfer reducing means constituting control means for regulating heat conduction from said metallic base body to said heat-conducting surface layer and from said heat carrier medium guided in said plurality of lengthwise grooves to at least one of said two confronting surfaces;

said at least one surface further containing transverse grooves intercrossing with said plurality of lengthwise grooves;

said intercrossing lengthwise grooves and transverse grooves defining islands in said at least one surface;

said at least one surface further containing outflow grooves located in preselected ones of said islands; and each one of said outflow grooves being connected to an outflow line and serving for selectively outfeeding either one of (i) said heat carrier medium, (ii) a condensate formed from said heat carrier medium, or (iii) both said heat carrier medium and said heat carrier medium condensate.

43. An apparatus containing a work surface heated by a heat carrier medium, comprising:

a heat-conducting surfacer layer;

said work surface being located upon said heat-conducting surface layer;

a metallic base body;

said heat-conducting surface layer being carried by said metallic base body and having a surface confronting said metallic base body;

said metallic base body having a surface confronting said heat-conducting surface layer;

said surface of said heat-conducting surface layer and said surface of said metallic base body defining two mutually confronting surfaces;

at least one of said two mutually confronting surfaces being provided with a plurality of lengthwise grooves extending lengthwise of the associated one of said two mutually confronting surfaces;

the heat carrier medium heating said work surface by throughflow of said heat carrier medium through said plurality of lengthwise grooves;

said plurality of lengthwise grooves constituting control means for regulating heat conduction from said metallic base body to said heat-conducting surface layer and from said heat carrier medium guided in said plurality of lengthwise grooves to at least one of said two confronting surfaces;

said work surface being located upon a heated cylinder;

said heated cylinder constituting part of a papermaking machine;

said heated cylinder containing a cylinder jacket defining said heat-conducting surface layer;

a core cylinder constituting said metallic base body;

said core cylinder having an axis;

said plurality of lengthwise grooves extend at least in part substantially parallel to said axis of said core cylinder;

said cylinder jacket of said heated cylinder is seated with direct metallic contact upon said core cylinder for the purpose of heat transfer from said core cylinder to said cylinder jacket;

said plurality of lengthwise grooves are each provided with flanks;

branched angular grooves provided in said flanks of said lengthwise grooves and extending from said lengthwise grooves;

supplementary grooves arranged laterally adjacent said lengthwise grooves and provided in at least one of said two mutually confronting surfaces;

each one of said lengthwise grooves possessing an inlet region for infeeding said heat carrier medium;

said core cylinder being provided with a roughened portion at least in said inlet region of said lengthwise grooves;

circumferential grooves provided in at least one of said two mutually confronting surfaces;

metal strips provided at least in said inlet region of said lengthwise grooves; and insulation strips being provided at least in said inlet region of said lengthwise grooves.

44. The apparatus as defined in claim 43, wherein:

said cylinder jacket defining said heat-conducting surface layer constitutes a metallic cylindrical outer jacket;

said lengthwise grooves including said branched angular grooves are machined into said core cylinder;

said circumferential grooves are machined into said core cylinder;

said supplementary grooves are machined into said core cylinder;

said metallic cylindrical outer jacket is drawn onto said core cylinder in metallic contact therewith while forming pressure chambers between said metallic cylindrical outer jacket and said core cylinder;

said metallic cylindrical outer jacket being welded at edges thereof with said core cylinder;

said branched angular grooves in said flanks of said lengthwise grooves possessing over at least part of their length an altering cross-section;

said supplementary grooves arranged laterally adjacent said lengthwise grooves possessing over at least part of their length an altering cross-section; and said supplementary grooves being provided along at least part of the length of said lengthwise grooves.

45. The apparatus as defined in claim 44, wherein:
said lengthwise grooves have a cross-section which increases towards the surface of the core cylinder.

46. The apparatus as defined in claim 44, wherein:
said supplementary grooves arranged adjacent said lengthwise grooves have a cross-section which increases towards the surface of the core cylinder.

47. The apparatus as defined in claim 43, wherein:
said core cylinder possesses two end faces;
said lengthwise grooves extending at continuously increasing cross-section from a predeterminate location between said two end faces towards said two end faces of said core cylinder.

48. The apparatus as defined in claim 47, wherein:
each one of said lengthwise grooves has a cross-sectional height; and
the height of the cross-section of said lengthwise grooves continuously increases from said predeterminate location between said two end faces of said core cylinder towards said two end faces of said core cylinder.

49. The apparatus as defined in claim 47, wherein:
each one of said lengthwise grooves has a cross-sectional width; and
the cross-sectional width of the cross-section of said lengthwise grooves continuously increases from said predeterminate location between said two end faces of said core cylinder towards said two end faces of said core cylinder.

50. The apparatus as defined in claim 47, wherein:
each one of said lengthwise grooves has a cross-sectional height; and
the cross-sectional height of said lengthwise grooves continuously decreases from said predeterminate location between said two end faces of said core cylinder towards the two end faces of said core cylinder.

51. The apparatus as defined in claim 47, wherein:
each one of said lengthwise grooves has a cross-sectional width; and
the cross-sectional width of said lengthwise grooves continuously decreases from said predeterminate location between said two end faces of said core cylinder towards the two end faces of said core cylinder.

52. The apparatus as defined in claim 43, further including:
a plurality of outflow grooves extending lengthwise of said core cylinder;
said plurality of outflow grooves being provided for selectively outfeeding either one of (i) said heat carrier medium, (ii) a condensate formed from said heat carrier medium or (iii) both said heat carrier medium and said heat carrier medium condensate;
said plurality of outflow grooves being arranged in alternation with said lengthwise grooves and in substantially parallel disposition with respect thereto; and
said plurality of outflow grooves being connected via said circumferential grooves with said lengthwise grooves.

53. The apparatus as defined in claim 52, wherein:
said plurality of outflow grooves possess a smaller cross-section than said main lengthwise grooves.

54. The apparatus as defined in claim 53, wherein:
each one of said plurality of outflow grooves has a groove base;
each one of said lengthwise grooves possessing a groove base;
the groove base of said plurality of outflow grooves is located radially further towards the outside of said core cylinder than the groove base of said lengthwise grooves.

55. The apparatus as defined in claim 54, wherein:
each of the plurality of circumferential grooves has a groove base;
the groove base of said circumferential grooves is located radially further towards the outside of said core cylinder than said groove base of said lengthwise grooves and also radially further towards the outside of said core cylinder than the groove base of said plurality of outflow grooves.

56. The apparatus as defined in claim 52, wherein:
said circumferential grooves said plurality of outflow grooves have corresponding cross-sections.

57. The apparatus as defined in claim 52, further including:
a plurality of cavities traversing said lengthwise grooves; and
said plurality of cavities interconnecting said circumferential grooves and said lengthwise grooves.

58. The apparatus as defined in claim 57, wherein:
said cavities each define a partially cylindrical base surface.

59. The apparatus as defined in claim 52, wherein:

said lengthwise grooves and said circumferential grooves have corresponding groove depths;

said circumferential grooves and said lengthwise grooves intercrossing each other and thereby forming islands defining said surface of said core cylinder;

a preselected number of said islands being provided with respective outflow grooves and outflow lines; and each one of said outflow grooves communicating with an associate one of said outflow lines.

60. The apparatus as defined in claim 43, wherein: said lengthwise grooves extend substantially in helical configuration about said core cylinder.

61. The apparatus as defined in claim 60, wherein: said helical configuration possesses a pitch angle of 10° to 30°.

62. The apparatus as defined in claim 43, wherein: said branched angular grooves in said flanks of said lengthwise grooves are provided in a spaced relationship from said inlet region of said lengthwise grooves; and said branched angular grooves enclosing an angle of less than 180°.

63. The apparatus as defined in claim 62, wherein: each one of said lengthwise grooves possesses an outlet region for selectively outfeeding either one of (i) said heat carrier medium, (ii) condensate formed from said heat carrier medium, or (iii) both said heat carrier medium and said heat carrier medium condensate;

said branched angular grooves in said flanks of said lengthwise grooves extend towards said outlet region of said lengthwise grooves.

64. The apparatus as defined in claim 43, wherein: said supplementary grooves are arranged at least in said inlet region of said lengthwise grooves;

said supplementary grooves being provided at said surface associated with said core cylinder and confronting said cylinder jacket;

said supplementary grooves being open in the direction of said cylinder jacket; and said supplementary grooves containing a widened portion.

65. The apparatus as defined in claim 64, wherein: said lengthwise grooves are provided in said inlet region with a substantially rectangular cross-section; and said supplementary grooves possess a substantially triangular cross-sectional configuration.

66. The apparatus as defined in claim 64, wherein: said supplementary grooves are provided at one side of said main lengthwise grooves.

67. The apparatus as defined in claim 64, wherein: said supplementary grooves are provided at both sides of said main lengthwise grooves.

68. The apparatus as defined in claim 43, wherein: said metal strips are provided in said inlet region of said lengthwise grooves; and said metal strips bridge associated openings of respective ones of said lengthwise grooves.

69. The apparatus as defined in claim 43, wherein: said lengthwise grooves continuously change their cross-section, as viewed in a predeterminate flow direction of said heat carrier medium, from said inlet region through an intermediate region containing said branched angular grooves to an outlet region of said lengthwise grooves.

70. The apparatus as defined in claim 69, wherein: said inlet region has a substantially rectangular configuration.

71. The apparatus as defined in claim 69, wherein: said inlet region has a substantially triangular configuration.

72. The apparatus as defined in claim 69, wherein: said inlet region has a substantially trapezoidal configuration.

73. The apparatus as defined in claim 69, wherein: said outlet region possesses an angle-shaped cross-sectional configuration.

74. The apparatus as defined in claim 43, wherein: said branched angular grooves constitute two branched angular grooves enclosing an angle less than 180 degrees and communicating laterally with the associated one of said lengthwise grooves.

75. The apparatus as defined in claim 43, wherein: parts of said lengthwise grooves are provided in the surface of said core cylinder;

remaining parts of said lengthwise grooves are provided in the surface of said cylinder jacket; and said parts of said lengthwise grooves provided in said surface of the core cylinder and said remaining parts of said lengthwise grooves provided in said surface of the cylinder jacket are superimposed and in registry with respect to one another.

76. The apparatus as defined in claim 43, wherein: each one of said lengthwise grooves contains an angle-shaped groove in spaced relationship from said inlet region of said lengthwise grooves.

77. The apparatus as defined in claim 76, wherein: each one of said lengthwise grooves possesses an outlet region for selectively outfeeding either one of (i) said heat carrier medium, (ii) a condensate formed from said heat carrier medium, or (iii) both said heat carrier medium and said heat carrier medium condensate; and said angle-shaped groove being provided at least in said outlet region of each one of said lengthwise grooves.

78. The apparatus as defined in claim 76, wherein: said angle-shaped grooves constitute separate grooves enclosing an angle of less than 180 degrees.

79. The apparatus as defined in claim 76, wherein: said angle-shaped grooves constitutes separate branch grooves which extend lengthwise from a predeterminate location of the associated lengthwise grooves in a divergent manner.

* * * * *